US012188874B2

(12) United States Patent
Rao et al.

(10) Patent No.: US 12,188,874 B2
(45) Date of Patent: Jan. 7, 2025

(54) CHEMILUMINESCENCE DETECTOR AND DETECTION METHOD THEREOF

(71) Applicant: Shenzhen New Industries Biomedical Engineering Co., Ltd., Guangdong (CN)

(72) Inventors: Wei Rao, Guangdong (CN); Li Yin, Guangdong (CN); Liang Zhu, Guangdong (CN); Junhui Tang, Guangdong (CN); Yi Hu, Guangdong (CN)

(73) Assignee: Shenzhen New Industries Biomedical Engineering Co., Ltd., Guangdong (CN)

( * ) Notice: Subject to any disclaimer, the term of this patent is extended or adjusted under 35 U.S.C. 154(b) by 994 days.

(21) Appl. No.: 16/212,714

(22) Filed: Dec. 7, 2018

(65) Prior Publication Data
US 2019/0204233 A1    Jul. 4, 2019

(30) Foreign Application Priority Data
Dec. 28, 2017    (CN) .......................... 201711465127.0

(51) Int. Cl.
*G01N 21/76* (2006.01)
*G01N 21/25* (2006.01)
(Continued)

(52) U.S. Cl.
CPC .......... *G01N 21/76* (2013.01); *G01N 21/253* (2013.01); *G01N 21/6428* (2013.01);
(Continued)

(58) Field of Classification Search
CPC ............... G01N 21/76; G01N 35/0099; G01N 35/025; G01N 35/10; G01N 35/1004;
(Continued)

(56) References Cited

U.S. PATENT DOCUMENTS

2002/0131895 A1 * 9/2002 Gjerdingen ............... B01L 7/00
                                                      422/64
2005/0013737 A1    1/2005 Chow et al.
(Continued)

FOREIGN PATENT DOCUMENTS

| CN | 104777321 A | 7/2015 |
| CN | 106841644 A | 6/2017 |
| CN | 207866715 U | 9/2018 |
| JP | H0634639 A | 2/1994 |
| JP | 2010032386 A * | 2/2010 |
| WO | 2017168993 A1 | 10/2017 |

*Primary Examiner* — Matthew D Krcha
*Assistant Examiner* — Austin Q Le
(74) *Attorney, Agent, or Firm* — Samson G. Yu

(57) ABSTRACT

The disclosure provides a chemiluminescence detector. The chemiluminescence detector includes a reagent storage device, configured to store a reagent; a reaction device, configured to support a plurality of support reaction containers and perform a sample adding operation, a reagent adding operation and an incubating operation, the reaction device including a reaction outer disc mechanism configured to support the reaction containers and perform the reagent adding operation and an uniform mixing operation and a reaction inner disc mechanism configured to support the reaction containers and perform the incubating operation; a reagent storage device, a separate injection device, a cleaning device and a measuring device are arranged around an outer periphery side of the reaction outer disc mechanism. In this way, the operations on the reaction outer disc mechanism and the reaction inner disc mechanism is able to be performed simultaneously and are not interfered, so the detection speed of the chemiluminescence detector is improved.

15 Claims, 7 Drawing Sheets

(51) Int. Cl.
*G01N 21/64* (2006.01)
*G01N 35/02* (2006.01)
*G01N 35/04* (2006.01)

(52) U.S. Cl.
CPC ....... *G01N 21/6452* (2013.01); *G01N 35/025* (2013.01); *G01N 2035/0439* (2013.01)

(58) Field of Classification Search
CPC ........... G01N 35/1065; G01N 35/1067; G01N 2035/00178; G01N 2035/0439; G01N 2035/0441; G01N 2035/0443; G01N 2035/0444; G01N 2035/0453; G01N 2035/0455
See application file for complete search history.

(56) References Cited

U.S. PATENT DOCUMENTS

| | | | |
|---|---|---|---|
| 2005/0123445 A1* | 6/2005 | Blecka | G01N 35/025 422/64 |
| 2010/0288395 A1* | 11/2010 | Hagen | B01L 3/52 141/234 |
| 2012/0294764 A1* | 11/2012 | Tokieda | G01N 35/04 422/65 |
| 2013/0034466 A1* | 2/2013 | Wakamiya | G01N 35/0092 422/63 |
| 2014/0273241 A1* | 9/2014 | Ochranek | G01N 35/1002 436/45 |
| 2018/0180607 A1* | 6/2018 | Kubo | G01N 35/0098 |
| 2019/0339295 A1* | 11/2019 | Makino | G01N 35/0095 |

* cited by examiner incubation cup placing station

CHEMILUMINESCENCE DETECTOR AND DETECTION METHOD THEREOF

TECHNICAL FIELD

The present disclosure relates to the technical field of chemiluminescence detection, and more particularly, to a chemiluminescence detector and a detection method thereof.

BACKGROUND

A chemiluminescence immunoassay is an in-vitro detection analysis technology in combination of antigen-antibody immunoreaction and luminous reaction. With an immunology theory as a basis and a illuminate marker as a tracing signal, and through collecting an optical signal to detect multiple markers, it has the advantages of high sensitivity, low nonspecific adsorption and high accuracy. Along with the high-speed development of a biomedical device, certain conditions for implementing complete automation of a chemiluminescence detector have been achieved.

Generally, a chemiluminescence detector based on the chemiluminescence immunoassay has become a mature medical diagnostic device. However, a universal chemiluminescence detector has expensive price, heavy size and huge power consumption and thus is popularized and promoted difficultly. In addition, with the high-speed development of the biomedical device, the certain conditions for implementing the complete automation of the chemiluminescence detector have been achieved.

The chemiluminescence detector mainly includes a reaction cup loading device, a sample adding device, an incubation reaction device, a cleaning device, a measuring device, a control system and a software system. Nevertheless, each procedure of the existing chemiluminescence detector such as reaction cup adding, sample adding, reagent adding and uniform mixing is distributed in a production line, resulting in that the each procedure is time-consuming and takes up a relatively large space during implementation and thus the detection efficiency is affected.

SUMMARY

In view of this, for a problem of long operation time due to the fact that each procedure in existing sample reaction is time-consuming and takes up a relatively large space during implementation, it is necessary to provide a chemiluminescence detector that shortens the operation time, reduces the space occupation and improves the detection efficiency. And meanwhile, a detection method using the chemiluminescence detector is further provided.

The above objective is implemented by the following technical solutions.

A chemiluminescence detector includes:
a reagent storage device, configured to store a reagent;
a reaction device, configured to support a plurality of support reaction containers and perform a sample adding operation, a reagent adding operation and an incubating operation, the reaction device including a reaction outer disc mechanism configured to support the reaction containers and perform the reagent adding operation and an uniform mixing operation and a reaction inner disc mechanism configured to support the reaction containers and perform an incubating operation, the reaction outer disc mechanism being arranged outside the reaction inner disc mechanism in a sleeving manner, the reaction outer disc mechanism and the reaction inner disc mechanism being respectively and independently operated and the reaction outer disc mechanism and the reaction inner disc mechanism being arranged coaxially:
a separate injection device, configured to respectively transfer a sample and the reagent to the reaction containers;
a cleaning device, configured to remove impurities in the reaction containers; and
a measuring device, configured to detect a to-be-tested substance in each of the reaction containers,
wherein the reagent storage device, the separate injection device, the cleaning device and the measuring device are arranged around an outer periphery side of the reaction outer disc mechanism.

In one embodiment, the reaction device further includes a buffer disc mechanism; and the buffer disc mechanism is provided independent of the reaction outer disc mechanism and is located at the outer periphery side of the reaction outer disc mechanism.

In one embodiment, the separate injection device includes a sample adding mechanism and a plurality of liquid transfer mechanisms; the sample adding mechanism is located at an outer periphery side of the buffer disc mechanism and is configured to transfer the sample to each of the reaction containers of the buffer disc mechanism; the liquid transfer mechanisms are arranged corresponding to the reaction outer disc mechanism and reagent storage mechanisms of the reagent storage device; and the liquid transfer mechanisms transfer the reagent in the reagent storage mechanisms to the reaction container of the reaction outer disc mechanism.

In one embodiment, the reaction outer disc mechanism is provided with multiple reaction stations, including a cup adding station, a reagent adding station and an incubation cup taking station; the reaction inner disc mechanism is provided with an incubation cup placing station;
the buffer disc mechanism is arranged corresponding to the cup adding station; each of the reaction containers in the buffer disc mechanism is transferred to the cup adding station of the reaction outer disc mechanism;
the liquid transfer mechanisms and the reagent storage device are arranged corresponding to the reagent adding station; the liquid transfer mechanisms transfer the reagent in the reagent storage device to each of the reaction containers corresponding to the reagent adding station of the reaction outer disc mechanism;
the incubation cup taking station is arranged corresponding to the incubation cup placing station; and each of the reaction containers in the reaction outer disc mechanism is taken out at the incubation cup taking station and is transferred to the incubation cup placing station of the reaction inner disc mechanism.

In one embodiment, the reaction inner disc mechanism is provided with a cleaning cup taking station; the multiple reaction stations further include a cleaning cup placing station:
the cleaning device is arranged respectively corresponding to the cleaning cup taking station and the cleaning cup placing station; each of the reaction containers in the reaction inner disc mechanism is taken out at the cleaning cup taking station and is transferred to the cleaning device; and each of the reaction containers in the cleaning device is transferred to the cleaning cup placing station of the reaction outer disc mechanism.

In one embodiment, the reaction station further includes a uniform mixing station; the chemiluminescence detector further includes an uniform mixing device; the uniform mixing device is provided on the reaction outer disc mechanism, is arranged corresponding to the uniform mixing station and is configured to perform the uniform mixing operation on a mixture in each of the reaction containers in the reaction outer disc mechanism.

In one embodiment, the cup adding station, the cleaning cup placing station, the reagent adding station, the uniform mixing station and the incubation cup taking station are arranged sequentially on the reaction outer disc mechanism.

In one embodiment, the chemiluminescence detector further includes a reaction container automatic transmission device configured to transmit the reaction containers, the reaction container automatic transmission device is located at the outer periphery side of the buffer disc mechanism;
the chemiluminescence detector is further provided with a new cup grabbing mechanism; and the new cup grabbing mechanism is arranged corresponding to the reaction container automatic transmission device and the reaction device, and is configured to transfer each of the reaction containers in the reaction container automatic transmission device to the buffer disc mechanism.

In one embodiment, the chemiluminescence detector is further provided with a sample cup grabbing mechanism, an incubation cup grabbing mechanism, a cleaning cup grabbing mechanism and a measurement cup grabbing mechanism;
the sample cup grabbing mechanism is arranged corresponding to the buffer disc mechanism and the cup adding station of the reaction outer disc mechanism, and is configured to transfer a reaction container in which the sample is added completely in the buffer disc mechanism to the reaction outer disc mechanism;
the incubation cup grabbing mechanism is arranged corresponding to the incubation cup taking station of the reaction outer disc mechanism and the incubation cup placing station of the reaction inner disc mechanism, and is configured to transfer each of the reaction containers between the reaction outer disc mechanism and the reaction inner disc mechanism;
the cleaning cup grabbing mechanism is arranged corresponding to the cleaning device and the reaction outer disc mechanism, and is configured to transfer each of the reaction containers between the reaction outer disc mechanism and the cleaning device; and
the measurement cup grabbing mechanism is arranged corresponding to the cleaning device and the measuring device, and is configured to transfer each of the reaction containers after being cleaned in the cleaning device to the measuring device.

In one embodiment, the measuring device is arranged adjacent to the cleaning device.

In one embodiment, the chemiluminescence detector further includes a sample conveying device configured to convey the sample to a sample suction position; the sample suction position is arranged at a periphery side of the buffer disc mechanism and corresponding to the sample adding mechanism; and the sample adding mechanism sucks up the sample at the sample suction position and transfers the sample to the reaction containers of the reaction device.

In one embodiment, the sample conveying device includes a sample storage mechanism and a sample conveying mechanism detachably connected with the sample storage mechanism; multiple sample racks loaded with the sample are stored in the sample storage mechanism; the sample storage mechanism transfers each of the sample racks to the sample conveying mechanism; and the each of the sample racks is conveyed by the sample conveying mechanism to the sample suction position.

In one embodiment, an input end of the sample conveying mechanism is able to be in abutment joint with the sample storage mechanism, or is able to be in abutment joint with an output end of a sample conveying mechanism of another chemiluminescence detector; and an output end of the sample conveying mechanism is able to be in abutment joint with an input end of a sample conveying mechanism of a still another chemiluminescence detector.

In one embodiment, the chemiluminescence detector further includes a consumable box loading device configured to automatically transmit consumable storage boxes loaded with liquid suction heads; the consumable box loading device further is able to transmit the consumable storage boxes to a loading position; and the sample adding mechanism loads the liquid suction heads at the loading position and transfers the sample via the liquid suction heads.

In one embodiment, the consumable box loading device is located at the outer periphery side of the buffer disc mechanism far away from the reaction container automatic transmission device, and is arranged corresponding to the sample loading mechanism.

In one embodiment, the chemiluminescence detector further includes a pedestal; the pedestal is provided with a supporting platform; and the reaction device, the cleaning device, the separate injection device and the reagent storage device all are arranged on the supporting platform.

In one embodiment, the chemiluminescence detector further includes a control device and a liquid path device, the control device is electrically connected with the reaction device, the measuring device, the cleaning device, the separate injection device and the reagent storage device; the liquid path device is connected with the separate injection device; the pedestal is further provided with a holding space; the holding space is located below the supporting platform; and the control device and the liquid path device are provided in the holding space.

A detection method of a chemiluminescence detector includes the following steps:
a sample adding step: respectively transferring a sample to reaction containers;
a reagent adding step: respectively transferring a reagent to the reaction containers;
a uniform mixing step: uniformly mixing a mixture in each of the reaction containers;
an incubating step: performing an incubating operation on the mixture after being uniformly mixed in each of the reaction containers;
a separating and cleaning step: removing impurities in each of the reaction containers after being incubated, and
a measuring step: detecting a to-be-tested substance in each of the reaction containers after being cleaned.

In one embodiment, the detection method further comprises the following steps:
before the separating and cleaning step, repeatedly executing at least one cycle of the reagent adding step, the uniform mixing step and the incubating step; and/or
before the measuring step, repeatedly executing at least one cycle of the reagent adding step, the uniform mixing step, the incubating step and the separating and cleaning step.

In one embodiment, before the measuring step, at least one separating and cleaning operation is performed on the impurities in the reaction containers after being incubated in the separating and cleaning step.

After adopting the above technical solutions, some embodiments of the present disclosure achieve the following beneficial effects.

According to the chemiluminescence detector and the detection method thereof provided by the some embodiments of the present disclosure, when the sample is detected, the reaction outer disc mechanism can support the reaction containers with the sample and performs the reagent adding operation and uniform mixing operation on the reaction containers; the reaction inner disc mechanism can support the reaction containers after being uniformly mixed and performs the incubating operation on the mixture after being uniformly mixed in the reaction containers; after the incubation, the impurities of the reaction containers are cleaned in the cleaning device; and then, the to-be-tested substance is detected via the measuring device. The reaction outer disc mechanism and the reaction inner disc mechanism are operated independently, and the operations on the reaction outer disc mechanism and the reaction inner disc mechanism is able to be performed simultaneously and are not interfered, so a problem of long operation time due to the fact that each procedure of existing sample reaction is time-consuming during implementation is effectively solved, the detection speed of the chemiluminescence detector is improved, and thus the detection efficiency is guaranteed; moreover, since the reaction outer disc mechanism is arranged outside the reaction inner disc mechanism in the sleeving manner, the space occupied by the reaction device is able to be greatly reduced, and thus the overall size of the chemiluminescence detector is reduced; and therefore, the chemiluminescence detector is compact in structure and is beneficial to miniaturized development.

Figure 1:
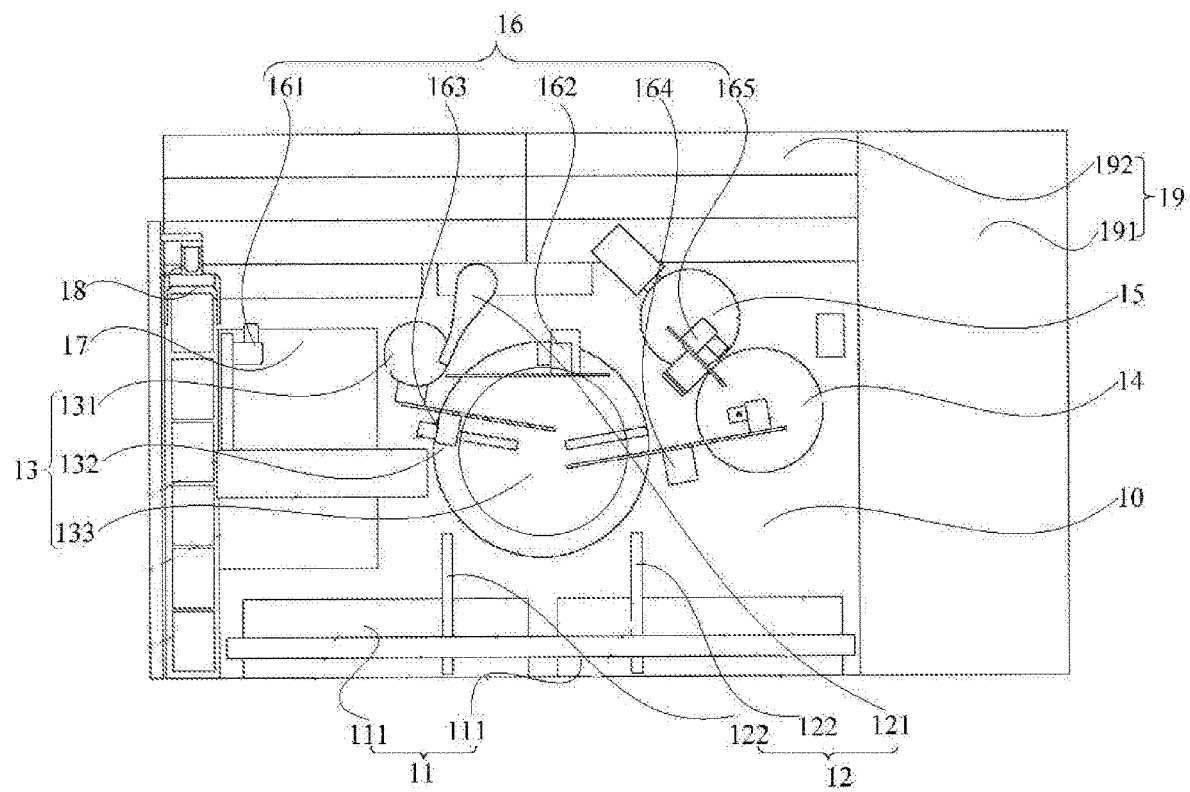
FIG. 1 is a top view of a chemiluminescence detector in an embodiment of the present disclosure.
Figure 2:
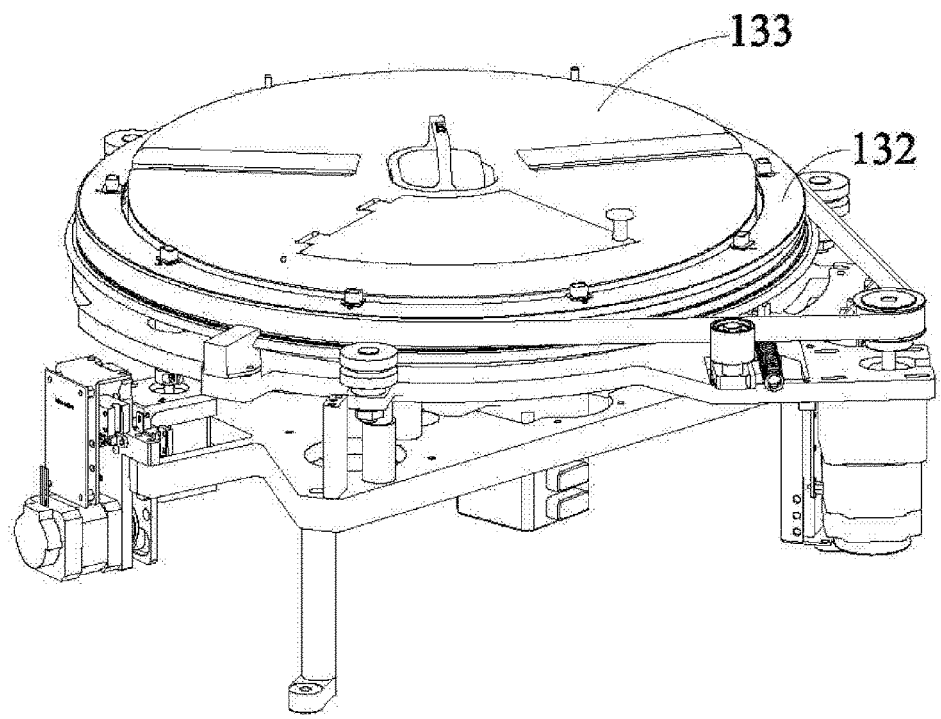
FIG. 2 is a structural schematic diagram of a reaction outer disc mechanism and a reaction inner disc mechanism in the chemiluminescence detector shown in FIG. 1.
Figure 3:
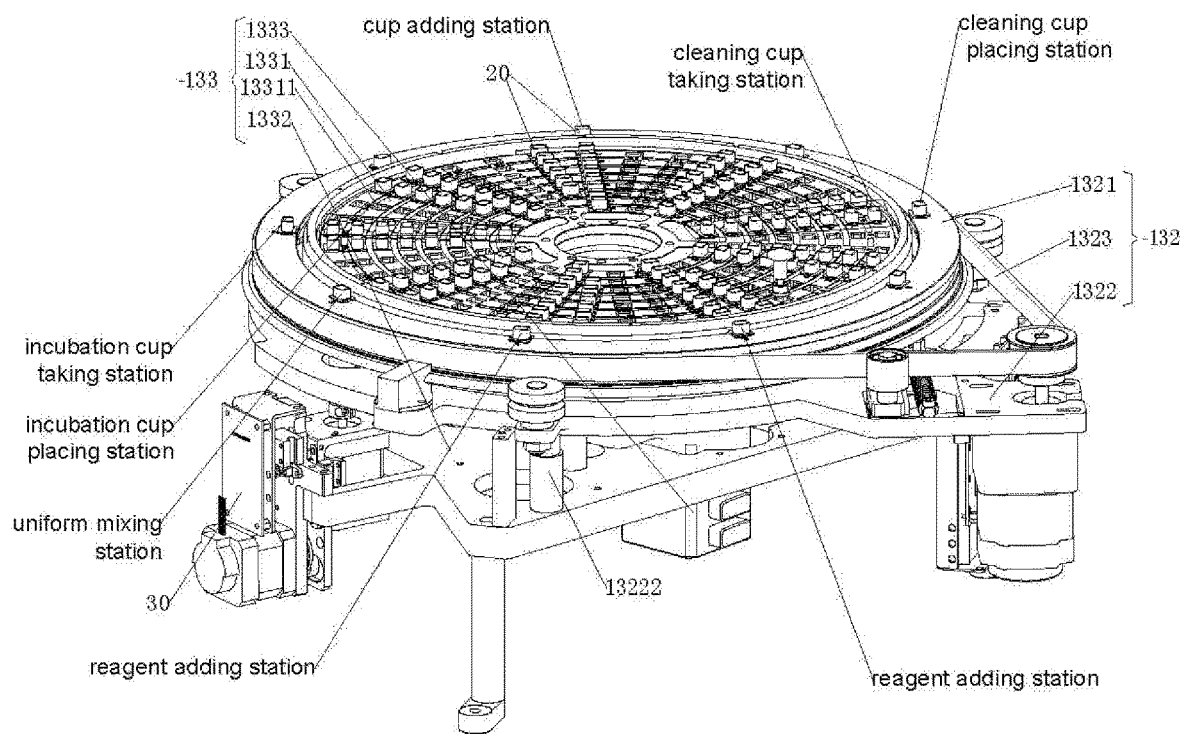
FIG. 3 is a structural schematic diagram of the reaction outer disc mechanism and the reaction inner disc mechanism shown in FIG. 2 after a heat preservation cover structure is removed.
Figure 4:
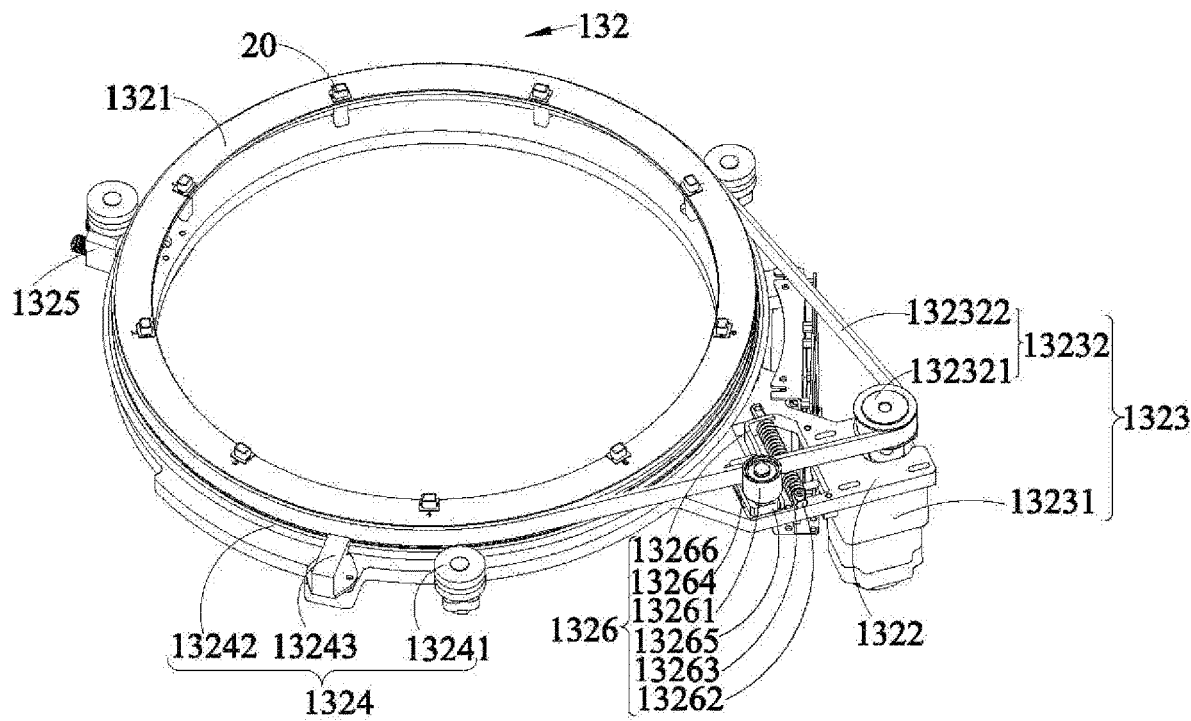
FIG. 4 is a stereoscopic diagram of the reaction outer disc mechanism shown in FIG. 3 from top to bottom at an angle.
Figure 5:
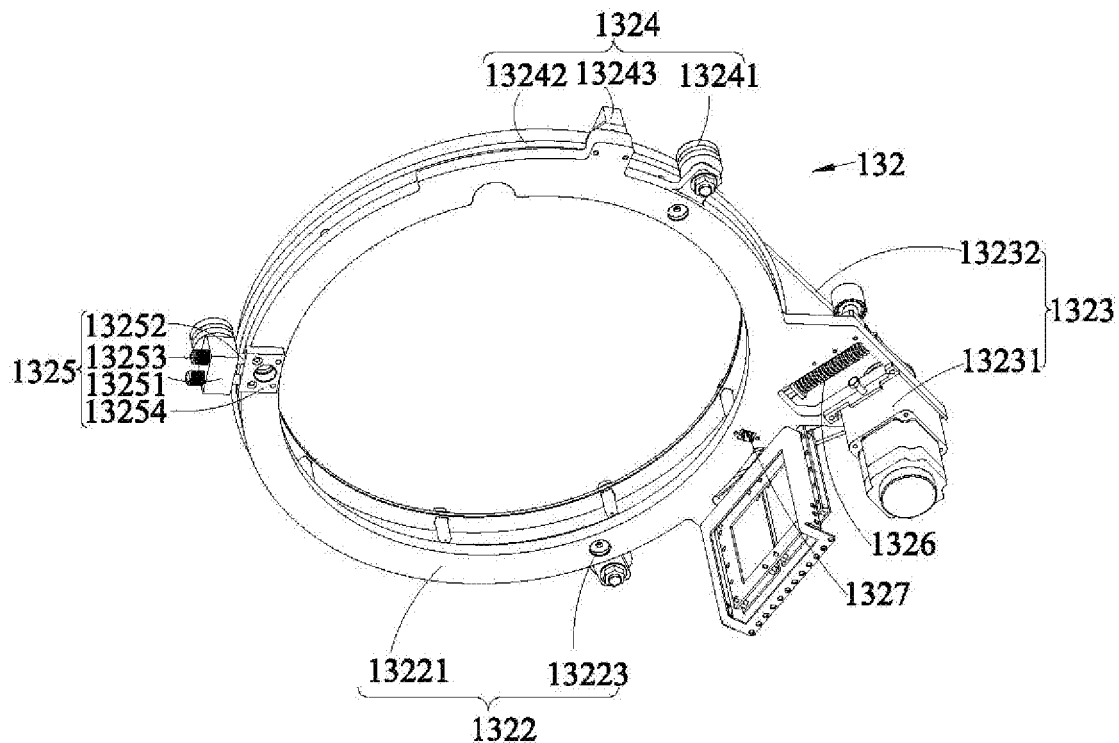
FIG. 5 is a stereoscopic diagram of the reaction outer disc mechanism shown in FIG. 4 from bottom to top.
Figure 6:
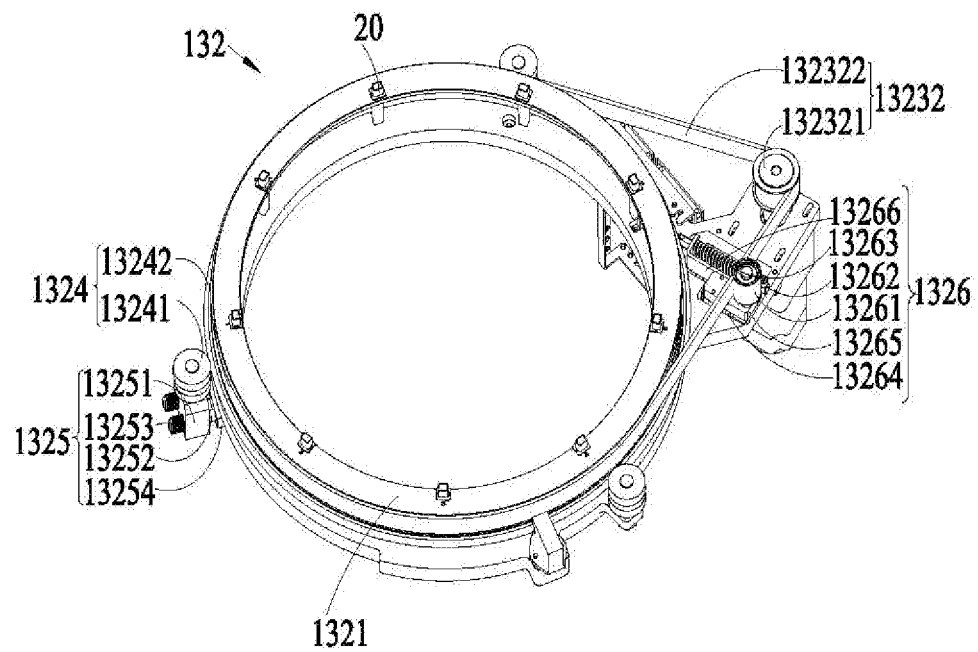
FIG. 6 is a stereoscopic diagram of the reaction outer disc mechanism shown in FIG. 4 at another angle.
Figure 7:
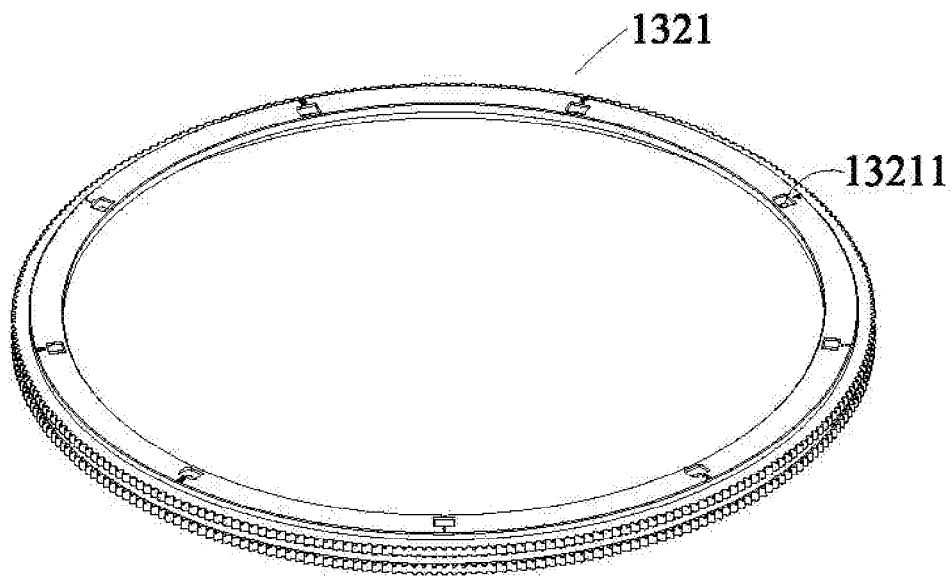
FIG. 7 is a stereoscopic diagram of a reaction outer disc supporting plate in the reaction outer disc mechanism shown in FIG. 4.
Figure 8:
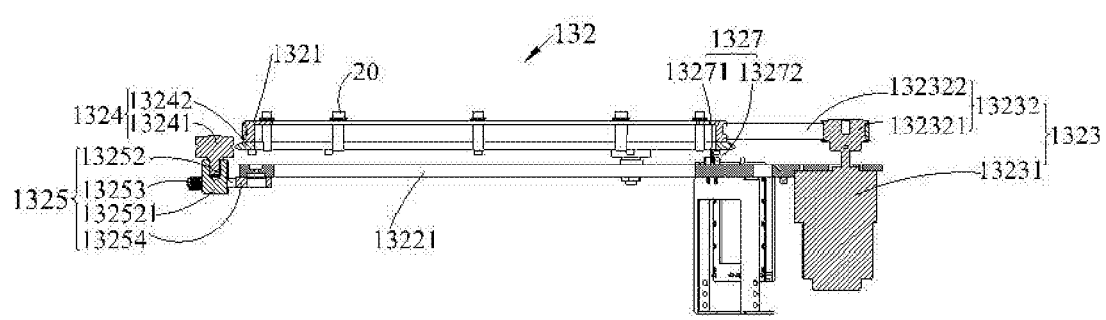
FIG. 8 is a sectional view of the reaction outer disc mechanism shown in FIG. 4.
Figure 9:
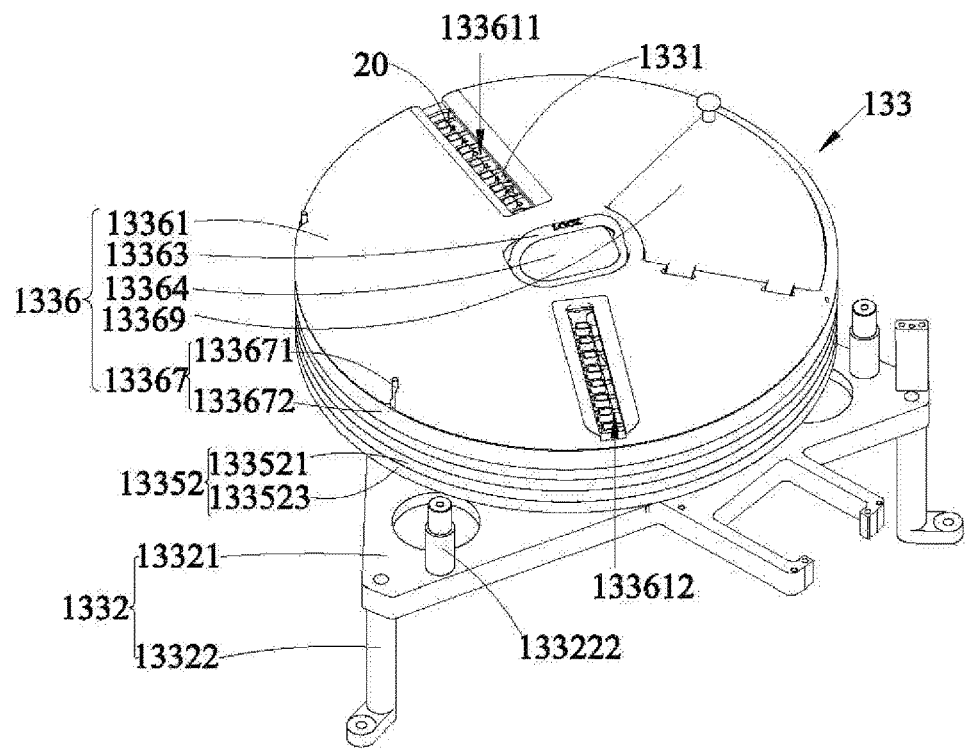
FIG. 9 is a stereoscopic diagram of the reaction inner disc mechanism shown in FIG. 2.
Figure 10:
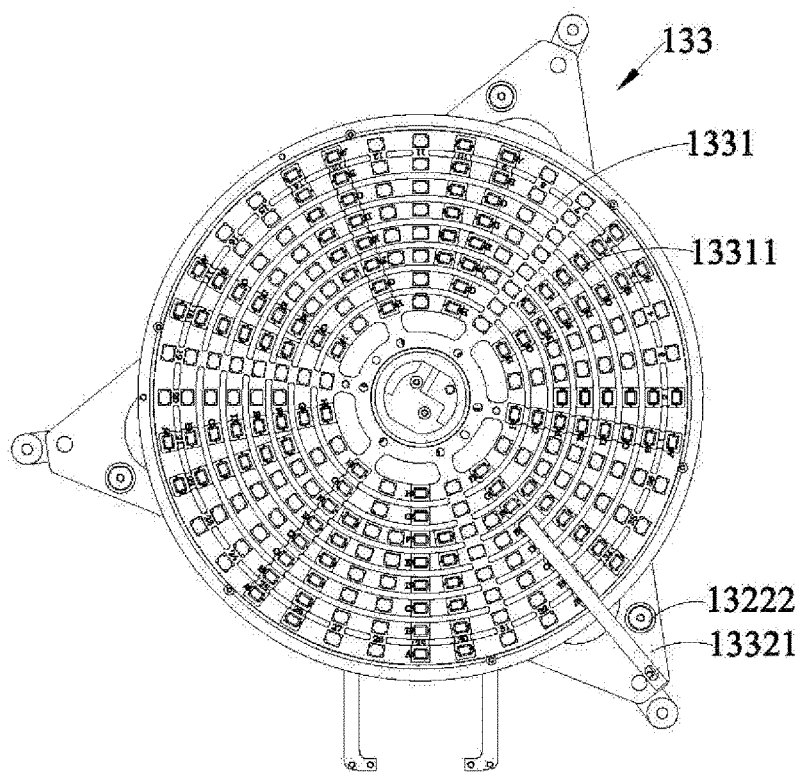
FIG. 10 is a top view of the reaction inner disc mechanism shown in FIG. 9 after a heat preservation cover structure is removed.
Figure 11:
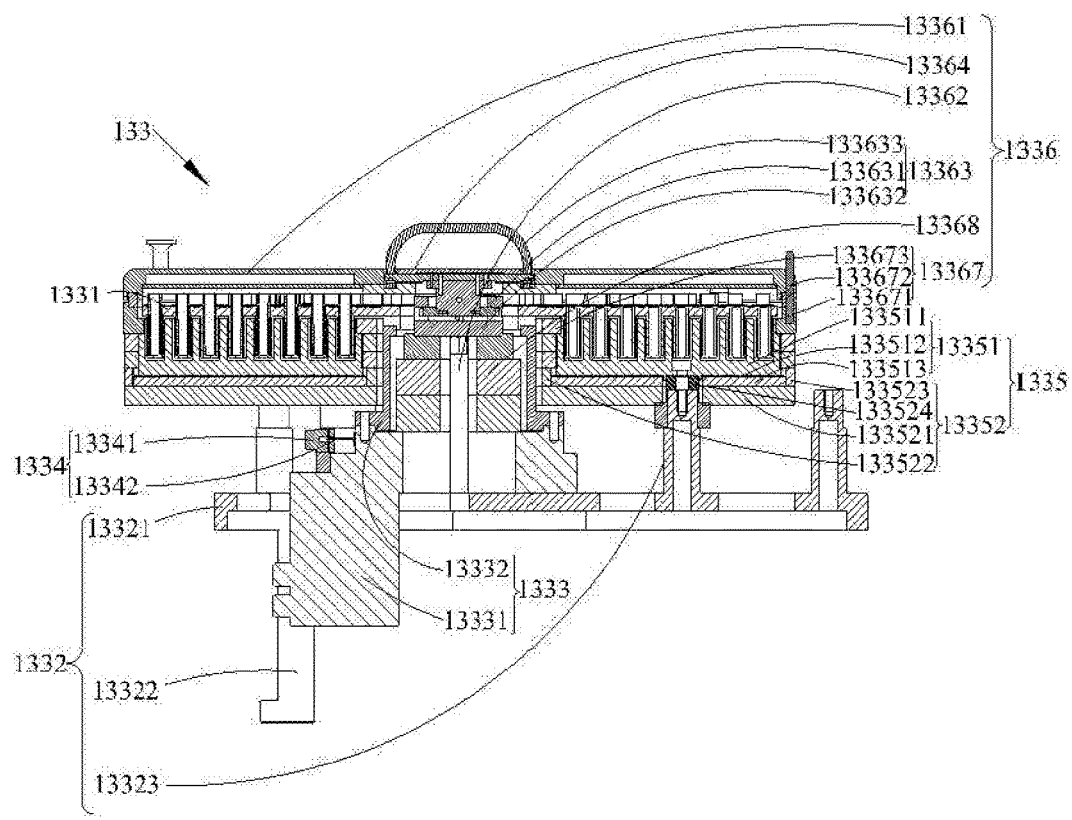
FIG. 11 is a sectional view of the reaction inner disc mechanism shown in FIG. 9.

In the drawings:
- 10—a pedestal;
- 11—a reagent storage device;
  - 111—a reagent storage mechanism;
- 12—a separate injection device;
  - 121—a sample adding mechanism;
  - 122—a liquid transfer mechanism;
- 13—a reaction device;
  - 131—a buffer disc mechanism;
  - 132—a reaction outer disc mechanism;
    - 1321—a reaction outer disc supporting plate;
      - 13211—a placement hole;
    - 1322—a reaction outer disc mounting structure;
      - 13221—a reaction outer disc mounting bottom plate;
      - 13222—a reaction outer disc support column;
      - 13223—a reaction outer disc mounting hole;
    - 1323—a reaction outer disc driving structure;
      - 13231—a reaction outer disc driving motor;
      - 13232—a reaction outer disc transmission component; 132321—a reaction outer disc driving wheel; 132322—a reaction outer disc synchronous belt;
    - 1324—a guiding limit structure;
      - 13241—a rolling support;
      - 13242—a guiding limit guide rail;
      - 13243—a lubrication component;
    - 1325—a compaction structure:
      - 13251—a compaction mounting seat;
      - 13252—a compaction guiding rod;
      - 13253—a compaction elastic piece;
      - 13254—a compaction fixed seat;
    - 1326—a tension structure;
      - 13261—a tension wheel;
      - 13262—a tension guiding rod;
      - 13263—a tension elastic piece;
      - 13264—a tension slide rail;
      - 13265—a tension slide block;
      - 13266—a tension connecting piece;
    - 1327—a reaction outer disc detection structure;
      - 13271—a reaction outer disc induction piece;
      - 13272—a reaction outer disc initialization detection piece;
  - 133—a reaction inner disc mechanism;
    - 1331—a reaction inner disc supporting plate;
      - 13311—an incubation hole;
    - 1332—a reaction inner disc mounting structure;
      - 13321—a reaction inner disc mounting bottom plate;
      - 13322—a reaction inner disc support column;
      - 13323—a reaction inner disc mounting column;
    - 1333—a reaction inner disc driving structure;
      - 13331—a rotary platform;
      - 13332—a rotary cushion block;
    - 1334—a reaction inner disc detection structure;
      - 13341—a reaction inner disc detection piece;
      - 13342—a reaction inner disc induction piece;
    - 1335—a reaction temperature control structure;
      - 13351—a reaction heating component;
        - 133511—a constant temperature seat;
        - 133512—a heating element;
        - 133513—a heating belt clamp block;
      - 13352—a reaction heat preservation component;
        - 133521—a bottom heat preservation cotton;
        - 133522—an inner wall heat preservation cotton; 133523—an outer heat preservation cotton;
133524—a heat insulated block;
1336—a heat preservation cover structure;
13361—a cover body; 133611—an incubation cup placing groove;
133612—a cleaning cup taking groove;
13362—a cover body supporting column;
13363—a locking component;
133631—a locking piece;
133632—a lock-up piece;
133633—a prodding piece;
13364—a core cover;
13367—a fixed component; 133671—an annular external pressure block; 133672—a guide pin; 133673—an annular internal pressure block;
13368—a core heat preservation cotton;
13369—an observation cover;
14—a cleaning device;
15—a measuring device;
16—a cup grabbing device;
161—a new cup grabbing mechanism;
162—a sample cup grabbing mechanism;
163—an incubation cup grabbing mechanism;
164—a cleaning cup grabbing mechanism;
165—a measurement cup grabbing mechanism;
17—a reaction container automatic transmission device;
18—a consumable box loading device;
19—a sample conveying device;
191—a sample storage mechanism;
192—a sample conveying mechanism;
20—a reaction container;
30—an uniform mixing device.

DETAILED DESCRIPTION OF THE EMBODIMENTS

In order for clearer explanations of purposes, technical solutions and advantages of the present disclosure, the present disclosure is further described in details in combination with some embodiments and accompanying drawings. It should be understood that the specific examples described herein are only for the purpose of explaining the present disclosure but not for limiting the present disclosure.

It should be noted that, numbers of the components in itself such as "first" and "second" described herein are only used to distinguish description objects, rather than to describe a special order or a technical meaning. "Connection" and "interconnection" described herein all include direct and indirect connection (interconnection) unless otherwise specified. As described herein, it should be understood that, a direction or positional relationship indicated by terminologies such as "upper", "lower", "front", "rear", "left", "right", "vertical" horizontal "top", "bottom", "inside", "outside", "clockwise" and "counterclockwise" is a direction or positional relationship indicated based on the accompanying drawings, and is only for describe the present disclosure conveniently and simplify the description and does not indicate or imply that the device or component must have a special direction and is not constructed and operated in the special direction, and thus is not understood as the limit of the present disclosure.

As used herein, unless otherwise specified and limited clearly, the first characteristic is "above" or "below" the second characteristic, which may be that the first and second characteristics are directly contacted, or the first and second characteristics are indirectly contacted via an intermediary. Moreover, the first characteristic is "on", "above" and "over" the second characteristic, which may be that the first characteristic is above or at an inclined top of the second characteristic, or only indicates that the first characteristic is horizontally higher than the second characteristic. Moreover, the first characteristic is "under", "below" and "beneath" the second characteristic, which may be that the first characteristic is below or at an inclined bottom of the second characteristic, or only indicates that the first characteristic is horizontally lower than the second characteristic.

Referring to FIG. 1, the present embodiment provides a chemiluminescence detector. The chemiluminescence detector can treat a sample and performs analysis detection on a treated sample to obtain a corresponding detection result and to meet the use requirement. It is to be noted that, the specific type of the to-be-tested sample is not limited. In some embodiments, the to-be-tested sample includes a solid sample or a liquid sample. Further, the liquid sample includes but not limited to a blood sample. According to the chemiluminescence detector provided by the present disclosure, an adding action, a uniform mixing action and an incubating action of a reagent is able to be performed at different positions respectively, so interference of the mutual operations is avoided; and meanwhile, the operations further is able to be performed simultaneously, so the detection speed of the chemiluminescence detector is improved, and thus the detection efficiency is guaranteed.

In the present disclosure, the chemiluminescence detector includes a reagent storage device 11, a reaction device 13, a separate injection device 12, a cleaning device 14 and a measuring device 15. The reagent storage device 11 is configured to store the reagent and can store various reagents during sample detection, so that a need reagent is selected conveniently and the efficiency of adsorbing the reagent is improved. It should be understood that, the reagent storage device 11 can store various reagents. The reagent storage device 11 further has a refrigeration function and is configured to store a low-temperature reagent, thereby implementing the storage of the reagent. The reaction device 13 is configured to support a plurality of support reaction containers 20 and performs a sample adding operation, a reagent adding operation and an incubating operation. In this way, the sample in the reaction containers 20 is able to be reacted with the reagent fully, the sample reaches to optimal reaction conditions and the sample parameters are detected conveniently. The separate injection device 12 is configured to adsorb and discharge the sample or the reagent, so that the sample or the reagent is added to the corresponding reaction containers 20. The cleaning device 14 is configured to remove impurities in the reaction container 20 after being incubated. The measuring device 15 is configured to detect a to-be-tested substance in each of the reaction containers 20.

In order to understand the names of the sample and the reagent in each stage, the names of the sample and the reagent in the each stage are described in detail here. The sample after being mixed with the reagent in the reaction containers is referred to as a mixture. The reaction device 13 can perform an incubating operation on the mixture in the reaction containers, so that the sample is fully reacted with the reagent. At this moment, the substances in the reaction containers are the to-be-tested substance and the impurities. Wherein, the mixture refers to substances formed after the sample and the reagent are mixed and are independent of ratios and concentrations of the sample and the reagent. Herein, the substances all are referred to as the mixture. The mixture after the reaction is presented in a manner of the to-be-tested substance and the impurities in the reaction containers. The impurities may be substances unreacted fully, also may be side-reaction products produced by side reactions, further may be other substances affecting the detection of the measuring device 15, or a combination of at least two of the above substances. The cleaning device 14 removes the impurities in the reaction containers, and the measuring device 15 detects the to-be-tested substance in the reaction containers, thereby obtaining various parameters of the sample.

It may be understood that, the reaction device 13 can perform the incubating operation on the mixture (namely, the sample and the reagent) in the reaction containers 20, so that the sample and the reagent are fully reacted and are combined. However, impurities in the reaction containers 20 need to be removed, for the fear of affecting the accuracy during the detection of the measuring device 15. Hence, regarding the reaction containers 20 of the reaction device 13, after the incubation, the impurities in the reaction containers 20 are separated and cleaned via the cleaning device 14, so that the impurities in the reaction containers 20 are removed and the to-be-tested substance is left in the reaction containers 20; and then, the measuring device 15 detects the to-be-tested substance in the reaction containers 20, thereby obtaining detection parameters of the sample. Further, the chemiluminescence detector further includes a cup grabbing device 16. The cup grabbing device 16 is configured to implement the transfer of the reaction containers 20 among the reaction device 13, the cleaning device 14 and the measuring device 15. As a result, the reaction containers 20 are located at each position and a corresponding operation is performed, thereby implementing automatic analysis detection of the sample and improving the operation efficiency.

When the chemiluminescence detector is operated, the reaction device 13 supports the reaction container 20, the separate injection device 12 adsorbs the sample and transfers the sample to the reaction containers 20, and the separate injection device 12 further is able to adsorb the reagent in the reagent storage device 11 and transfers the reagent to the reaction containers 20; thereafter, the reaction device 13 performs the uniform mixing operation on the reaction containers 20, so that the mixture in the reaction containers 20 is mixed uniformly, and the reaction device 13 performs the incubating operation on the mixture after being uniformly mixed in the reaction containers 20, so that the sample and the reagent are fully reacted. The cup grabbing device 16 transfers reaction containers 20 after complete reaction to the cleaning device 14. Impurities in the reaction containers 20 are removed via the cleaning device 14. After the cleaning, the cup grabbing device 16 transfers the reaction containers 20 to the measuring device 15. The to-be-tested substance in the reaction containers 20 is detected via the measuring device 15, so that various detection parameters of the sample are obtained and the use requirement is met.

Specifically, The reaction device 13 includes a reaction outer disc mechanism 132 configured to support the reaction containers 20 and perform the reagent adding operation and uniform mixing operation, and a reaction inner disc mechanism 133 configured to support the reaction containers 20 and perform the incubating operation. The reaction outer disc mechanism 132 is arranged outside the reaction inner disc mechanism 133 in a sleeving manner, and the reaction outer disc mechanism 132 and the reaction inner disc mechanism 133 are operated respectively and independently. The reaction containers 20 in which the sample is added completely are transferred to the reaction outer disc mechanism 132. Then, the separate injection device 12 can transfer the reagent to the reaction containers 20, in which the sample is added completely, on the reaction outer disc mechanism 132. Next, mixing is performed on the reaction containers 20 in which the sample and the reagent are added completely, so that the mixture is mixed uniformly. The reaction containers 20 after being mixed uniformly are transferred to the reaction inner disc mechanism 133. The incubating operation is performed on the mixture in the reaction containers 20, so that the sample reaches to the optimal reaction conditions, and the sample parameters are conveniently detected via the measuring device 15 of the chemiluminescence detector. Furthermore, the reaction outer disc mechanism 132 and the reaction inner disc mechanism 133 are arranged coaxially. In such a manner, the size of the reaction disc mechanisms is able to be reduced, and thus the overall size is reduced. Of course, in other embodiment of the present disclosure, the reaction outer disc mechanism 132 also may be provided independent of the reaction inner disc mechanism 133. The chemiluminescence detector is further provided with an incubation cup grabbing mechanism 163. That is, the cup grabbing device 16 further includes the incubation cup grabbing mechanism 163. The incubation cup grabbing mechanism 163 is arranged corresponding to the reaction outer disc mechanism 132 and the reaction inner disc mechanism 133, and is configured to transfer the reaction containers 20 between the reaction outer disc mechanism 132 and the reaction inner disc mechanism 133. It is to be noted that, the reaction outer disc mechanism 132 of the present disclosure further supports empty reaction containers or supports reaction containers having solutions such as a calibration solution in other embodiment. In this embodiment, the description is made only to the reaction outer disc mechanism 132 that supports reaction containers having the sample.

Moreover, the reagent storage device 11, the separate injection device 12, the cleaning device 14 and the measuring device 15 are arranged at the outer periphery side of the reaction outer disc mechanism 132. In this way, when each of the reaction containers 20 is transferred among the reaction outer disc mechanism 132, the reaction inner disc mechanism 133, the cleaning device 14 and the measuring device 15, the transfer path of the reaction container 20 is able to be shortened and the transfer efficiency is improved. Furthermore, when the separate injection device 12 transfers the sample and the reagent, the transfer path of the sample and the reagent further is able to be reduced, the transfer efficiency of the sample and the reagent is improved, and thus the operation efficiency of the chemiluminescence detector is improved. Meanwhile, each device of the chemiluminescence detector is arranged at the outer periphery side of the reaction outer disc mechanism 132, so each functional module of the chemiluminescence detector is able to be arranged reasonably in cooperation with the reaction outer disc mechanism 132, the chemiluminescence detector is compact in structure and the overall size of the chemiluminescence detector is greatly reduced.

Further, the reaction device 13 further includes a buffer disc mechanism 131. The buffer disc mechanism 131 is provided independent of the reaction outer disc mechanism 132 and is located at the outer periphery side of the reaction outer disc mechanism 132. In another embodiment, the buffer disc mechanism 131 also may be arranged with the reaction inner disc mechanism 133 and the reaction outer disc mechanism 132 in a sleeving manner layer by layer. The empty reaction containers 20 are transferred to the buffer disc mechanism 131, and then the separate injection device 12 can transfer a sample to the empty reaction containers 20 on the buffer disc mechanism 131. The reaction containers 20 in which the sample is added completely is able to be transferred to the reaction outer disc mechanism 132 for the reagent adding, uniformly mixing and incubating operations. In addition, the chemiluminescence detector is further provided with a sample cup grabbing mechanism 162. That is, the cup grabbing device 16 further includes the sample cup grabbing mechanism 162. The sample cup grabbing mechanism 162 is arranged corresponding to the reaction outer disc mechanism 131 and the reaction outer disc mechanism 132, and is configured to transfer the reaction containers 20 on the buffer disc mechanism 131 to the reaction outer disc mechanism 132. After the separate injection device 12 adds the sample to the reaction containers 20 on the buffer disc mechanism 131, the sample cup grabbing mechanism 162 can transfer the reaction containers 20 in which the sample is added completely to the reaction outer disc mechanism 132 and the reagent adding, uniform mixing and incubating operations are continuously performed in the reaction outer disc mechanism 132. Specifically, the buffer disc mechanism 131 includes a buffer supporting plate for supporting the reaction containers 20 and a buffer driving structure for driving the buffer supporting plate to rotate. The buffer driving structure adopts a motor and the like as a power source and implements the transfer of a movement via a synchronous belt transmission structure and the like, thereby driving the buffer supporting plate to rotate.

As an implementable embodiment, the separate injection device 12 includes a sample adding mechanism 121 and a plurality of liquid transfer mechanisms 122. The sample adding mechanism 121 is located at the outer periphery side of the buffer disc mechanism 131, and is configured to transfer the sample to the reaction containers 20 of the buffer disc mechanism 131. The chemiluminescence detector further includes a reaction container automatic transmission device 17 configured to transmit the reaction containers 20. The reaction container automatic transmission device 17 is located at the outer periphery side of the buffer disc mechanism 131. The sample adding mechanism 121 transfers the sample to the reaction containers 20 of the buffer disc mechanism 131. The reaction container automatic transmission device 17 is configured to transmit the reaction containers 20, thereby implementing automatic transmission of the reaction containers and improving the transmission efficiency. The reaction container automatic transmission device 17 and the sample adding mechanism 121 are located at a periphery side of the buffer disc mechanism 131, the cup grabbing device 16 transfers the reaction containers 20 in the reaction container automatic transmission device 17 to the buffer disc mechanism 131, and the sample adding device 121 can transfer the sample to the reaction containers 20. In this way, the path that the cup grabbing device 16 transfers the reaction containers 20 is able to be reduced, and the transfer speed of the reaction containers 20 is improved; meanwhile, the transfer speed of the sample further is able to be improved; and it may be understood that the operation efficiency of the chemiluminescence detector is improved. It may be understood that, the sample adding device 121 and the reaction container automatic transmission device 17 are arranged at different sides, so that a sample transfer operation of the sample adding mechanism 121 is able to be prevented from interfering with the cup grabbing device 16 during the process when the reaction containers 20 in the reaction container automatic transmission device 17 are transferred to the buffer disc mechanism 131, and the use performance of the chemiluminescence detector is guaranteed.

Surely, in other embodiment of the present disclosure, the reaction container automatic transmission device 17 also may be replaced. That is, the reaction container automatic transmission device 17 is not adopted to transmit the reaction containers 20, and the reaction containers 20 may be directly put into the reaction device 13. Preferably, the reaction containers 20 transmitted by the reaction container automatic transmission device 17 is a disposable consumable generally. Of course, the reaction container 20 also may be recycled. In another embodiment, when the reaction containers 20 are recycled, the reaction container automatic transmission device 17 also may not be adopted to transmit the reaction containers 20. It may be understood that, the reaction containers 20 refers to a consumable which is supported and on which the sample detection analysis is able to be performed, such as a reaction cup, a test tube, a sample slide and a sample tube. In this embodiment, the reaction containers 20 refer to the reaction ring. The reaction container automatic transmission device 17 generally transmits reaction container boxes. Reaction containers 20 provided in lines are supported in each of the reaction container boxes. Moreover, the reaction container boxes are not limited in principle in shape and may be of a square, a circle or other shapes, as long as each of the reaction container boxes are provided with the lug portion thereon to be transmitted by the reaction container automatic transmission device 17 conveniently.

Specifically, the reaction container automatic transmission device 17 includes a reaction container storage mechanism and a reaction container lifting mechanism. The reaction container storage mechanism is configured to load and store multiple reaction container boxes. The reaction container lifting mechanism is configured to store and lift each of the reaction container boxes, thereby implementing the transmission of each of the reaction containers 20. The reaction container lifting mechanism is located above the reaction container storage mechanism. The reaction container storage mechanism can transmit each of the reaction container boxes to the reaction container lifting mechanism. The reaction container lifting mechanism can receive the reaction container boxes to lift to a lesser top layer. Moreover, the reaction container storage mechanism and the reaction container lifting mechanism can respectively transmit the reaction container boxes. The reaction container storage mechanism and the reaction container lifting mechanism is able to be operated independently, and respectively transmit the reaction containers 20 in parallel. In this way, after the reaction container boxes in the reaction container storage mechanism are transmitted to the reaction container lifting mechanism in part or in whole, the reaction container boxes may be loaded to the reaction container storage mechanism, so that the reaction container lifting mechanism continuously lifts the reaction container boxes, and thus the continuous loading of the reaction container boxes are implemented, the overall efficiency is improved, and the reaction container lifting mechanism is not affected to transmit the reaction container boxes. Furthermore, the reaction container storage mechanism further is able to be in abutment joint and separation with the reaction container lifting mechanism, thus being convenient to load the reaction container boxes to the reaction container storage mechanism.

Further, the reaction container boxes in the reaction container storage mechanism are provided in a laminated manner. The multiple reaction container boxes are supported in the reaction container lifting mechanism in a layered manner. Therefore, the large-capacity storage of the reaction container boxes are able to be implemented, the layout positions of occupied instruments are reduced to the greatest extent, the structure of the reaction container automatic transmission device 17 is compact and thus the overall size of the chemiluminescence detector is reduced. In another embodiment, the reaction container lifting mechanism also can store the reaction container boxes in a laminated manner. Specifically, the reaction container storage mechanism includes a storage transmission structure and a storage supporting portion arranged on the storage transmission structure. Multiple reaction container boxes provided in a laminated manner are supported on the storage supporting portion. The storage supporting portion is driven via the storage transmission structure to lift, implementing the lifting of each of the reaction container boxes. In another embodiment, a structure capable of implementing a lifting motion such as a synchronous pulley structure and/or a gear rack structure is adopted by the storage transmission structure. A motor and the like are used as a power source of the storage transmission structure. A frame structure is further adopted by the reaction container storage mechanism to form a storage space for the reaction container boxes, which will not be repeated here. The reaction container lifting mechanism includes a lifting transmission structure and multiple pairs of opposite lifting supporting portions arranged on the lifting transmission structure. Each pair of the lifting supporting portions supports one reaction container box. The lifting supporting portions are driven via the lifting transmission structure to lift, implementing the lifting of the reaction container boxes. In another embodiment, a structure capable of implementing a lifting-turning motion such as the synchronous pulley structure is adopted by the lifting transmission structure. The motor and the like are used as a power source of the storage transmission structure, and the transfer of the motion is implemented via a gear, the synchronous belt structure and the like. A frame structure is further adopted by the reaction container lifting mechanism to form a lifting space for the reaction container box, which will not be repeated here.

The cup grabbing device 16 of the chemiluminescence detector grabs each of the reaction containers 20 in the reaction container boxes transmitted by the reaction container automatic transmission device 17 at a preset position. Specifically, when each of the reaction container boxes are transmitted to the preset position, the reaction container lifting mechanism moves upward with one layer and lifts the reaction container box at the lesser top layer to a top layer of the reaction container lifting mechanism, and then reaction container automatic transmission device 17 transmits the reaction container box on the top layer of the reaction container lifting mechanism to the preset position. In this way, the cup grabbing device 16 grabs the each of the reaction containers 20 in the reaction container boxes at the preset position and transfers the reaction container 20 to the reaction device 13.

In another embodiment, the reaction container automatic transmission device 17 further includes a push mechanism. The push mechanism is provided on the reaction container lifting mechanism and can push each of the reaction container boxes on the top layer of the reaction container lifting mechanism to the preset position. A structure that outputs a linear motion such as a slide rail and slide block structure or the synchronous belt structure is adopted by the push mechanism to push out the reaction container, and the motor and the like are used as its power source.

In another embodiment, the reaction container automatic transmission device 17 further includes a reaction container recycling mechanism. The reaction container recycling mechanism is located below the preset position, and can recycle an empty reaction container box at the preset position. The reaction container recycling mechanism is configured to implement the recycle and storage of the reaction container boxes, empty reaction container boxes are able to be conveyed to the reaction container recycling mechanism, implementing the recycle and storage of the reaction container boxes. When the reaction container recycling mechanism stores the reaction container boxes fully or partially, each of the reaction container boxes may be taken out from a bottom of the reaction container recycling mechanism. In this way, the reaction container boxes are able to be continuously recycled and conveniently used. The reaction container recycling mechanism includes a recycling transmission structure and a recycling supporting plate arranged on the recycling transmission structure. The recycling supporting plate is configured to support the reaction container boxes. The recycling transmission structure can drive the recycling supporting plate to lift, thereby implementing the recycling and storage of the reaction container boxes. Preferably, the structure capable of implementing the lifting motion such as the gear rack structure and the synchronous belt structure is adopted by the recycling transmission structure, and the motor and the like are adopted as its power source.

In another embodiment, the reaction container automatic transmission device 17 further includes a reaction container positioning and dropping mechanism. The reaction container positioning and dropping mechanism is arranged above the reaction container recycling mechanism. Each of the reaction container boxes on the reaction container lifting mechanism is able to be pushed onto the reaction container positioning and dropping mechanism by the push mechanism. The cup grabbing device 16 grabs the reaction containers 20 in the reaction container boxes on the reaction container positioning and dropping mechanism, and transfers the reaction containers 20 to the reaction device 13 for operations such as sample adding and reagent adding. The empty reaction containers 20 are dropped into the reaction container recycling mechanism via the reaction container positioning and dropping mechanism. It may be understood that, the reaction container positioning and dropping mechanism is simultaneously convenient to position the reaction container boxes, so that positions of the reaction container boxes are always fixed and the cup grabbing device 16 takes the reaction containers 20 in the reaction container boxes out conveniently at the reaction container 20 positioning and dropping mechanism. After the reaction containers 20 in the reaction container boxes are taken out completely, the reaction container boxes will be recycled. At this moment, the reaction container boxes are able to be dropped via the reaction container positioning and dropping mechanism and are stored in the reaction container recycling mechanism. As a result, the reaction container boxes are recycled conveniently. Specifically, the reaction container positioning and dropping mechanism opens or closes a dropping channel for each of the reaction container boxes via a slide opening-closing door. When the dropping channel is opened, each of the reaction container boxes are dropped into the reaction container recycling mechanism. When the dropping channel is closed, each of the reaction container boxes are able to be located in the reaction container positioning and dropping mechanism. Moreover, the reaction container positioning and dropping mechanism is provided with a positioning component. When the push mechanism pushes each of the reaction container boxes from the top layer of the reaction container lifting mechanism to the reaction container positioning and dropping mechanism, the each of the reaction container boxes are able to be propped against the positioning component, so that the each of the reaction container boxes are guaranteed to be positioned accurately and grabbed by the cup grabbing device 16 conveniently.

In another embodiment, the reaction container recycling mechanism includes a first reaction container recycling mechanism and a second reaction container recycling mechanism located below the first reaction container recycling mechanism. The second reaction container recycling mechanism may be in abutment joint and separation with the first reaction container recycling mechanism. The reaction container automatic transmission device 17 further includes a drawer mechanism. The reaction container storage mechanism and the second reaction container recycling mechanism are arranged on the drawer mechanism. The drawer mechanism can drive the reaction container storage mechanism and the second reaction container recycling mechanism to be pulled out and pushed in relative to the chemiluminescence detector. When the drawer mechanism is pulled out, the reaction container storage mechanism is separated from the reaction container lifting mechanism and the second reaction container recycling mechanism is separated from the first reaction container recycling mechanism. At this moment, the reaction container boxes may be loaded to the reaction container storage mechanism and the empty reaction container boxes in the second reaction container recycling mechanism may be taken out. When the drawer mechanism is pushed in, the reaction container storage mechanism is abutment joint with the reaction container lifting mechanism, the second reaction container recycling mechanism is in abutment joint with the first reaction container recycling mechanism, the reaction container storage mechanism can transmit the reaction container boxes to the reaction container lifting mechanism, and the second reaction container recycling mechanism can continuously recycle the reaction container boxes. Specifically, the drawer mechanism can slide along a slide rail. Through the chemiluminescence detector, the drawer mechanism is able to be controlled automatically to be pulled out and pushed in. The drawer mechanism also may be pulled out and pushed in using a manual manner.

Further, the chemiluminescence detector is further provided with a new cup grabbing mechanism 161. That is, the cup grabbing device 16 includes the new cup grabbing mechanism 161. The new cup grabbing mechanism 161 is arranged corresponding to the reaction container automatic transmission device 17 and the buffer disc mechanism 131, and is configured to transfer the reaction containers 20 in the reaction container automatic transmission device 17 to the buffer disc mechanism 131. It may be understood that, the new cup grabbing device 161 can grab the reaction containers 20 in the reaction container boxes on the reaction container positioning and dropping mechanism, and transfers the reaction containers 20 to the reaction device 131 for operations such as sample adding and reagent adding.

Moreover, liquid transfer mechanisms 122 are arranged corresponding to the reaction outer disc mechanism 132 and reagent storage mechanisms of the reagent storage device 111. The liquid transfer mechanisms 122 can transfer reagents in the reagent storage mechanisms 111 to the reaction containers 20 of the reaction outer disc mechanism 132. The reagent storage device includes a reagent bin body and a reagent bin temperature control structure. The reagent bin body is configured to store the reagents. The reagent bin temperature control structure is configured to control an environmental temperature in the reagent bin body. Moreover, the reagents are provided in rows and lines in the reagent bin body via reagent storage containers. The liquid transfer mechanisms 122 are moved on a horizontal plane and lifted on a vertical plane relative to the reagent bin body, thereby implementing adsorption of the reagents. Of course, in other embodiment of the present disclosure, a reagent plate also may be adopted by the reagent storage mechanisms respectively 111 to support the reagents. Through the reagent supporting plates, each of the reagents is driven to rotate to a preset station and the liquid transfer mechanisms 122 adsorb the reagents at the preset stations.

Specifically, the reagent bin temperature control structure is arranged below the reagent bin body. The reagent bin temperature control structure is configured to adjust the environmental temperature in the reagent bin body, so that the environmental temperature in the reagent bin body is between 2° C.-8° C. The reagent bin temperature control structure includes a refrigeration component and a heat dissipation air duct. The heat dissipation air duct includes an air duct box and an air blower. The air duct box is provided on a middle portion of the heat dissipation air duct. The refrigeration component is provided with a radiator. The radiator is provided in a cavity of the air duct box. The air blower is arranged at the downstream of the air duct box along a gas flow direction in the heat dissipation air duct. In this way, the flow of air in the heat dissipation air duct is able to be accelerated using a pumping action of the air blower and the air flow is more stable; and the radiator forcibly exchanges heat in a sealed cavity, further improving the heat exchange efficiency.

The liquid transfer mechanism 122 includes an X-axis moving component, a Y-axis moving component, a Z-axis moving component and a liquid transfer component. The X-axis moving component, the Y-axis moving component and the Z-axis moving component drive the liquid transfer component to move on an X-axis direction, a Y-axis direction and a Z-axis direction, so that the liquid transfer component is able to be moved to the reagent storage device 11 to adsorb the reagent, and further is able to be moved to the reaction outer disc mechanism 132 to add the reagent. It may be understood that, the X-axis moving component, the Y-axis moving component and the Z-axis moving component all adopt the synchronous belt structure and the like to implement the transfer of the motion and employ the motor as the power source. Moreover, a reagent needle is provided in the liquid transfer component. The reagent is adsorbed or discharged via the reagent needle. Furthermore, the liquid transfer component further implements to quantitatively adsorb the reagent using a structure such as an injection syringe or a plunger pump. Of course, in other embodiment of the present disclosure, a rotation manner also may be adopted by the liquid transfer mechanism 122 to adsorb the reagent or add the reagent. At this moment, the synchronous belt structure is adopted by the liquid transfer mechanism 122 to control the rotation of the liquid transfer component. Further, the chemiluminescence detector further includes a reagent needle cleaning part configured to clean the reagent needle of the liquid transfer mechanism 122. The reagent needle cleaning part is provided on the reagent storage mechanism 111. The liquid transfer mechanism 122 is cleaned by the reagent needle cleaning part after transferring the reagent once so as to avoid cross contamination.

Preferably, the reagent storage device 11 of the present disclosure employs and includes at least two reagent storage mechanisms 111. The separate injection device 12 includes a sample adding mechanism 121 and at least two liquid transfer mechanisms 122. In this way, each of the liquid transfer mechanisms 122 is corresponding to one reagent storage mechanism 111. The liquid transfer mechanisms 122 transfer the reagents in the corresponding reagent storage mechanisms 111 to corresponding reaction containers 20 of the reaction outer disc mechanism 132. When the chemiluminescence detector is operated, the at least two liquid transfer mechanisms 122 can respectively transfer the reagents in the corresponding reagent storage mechanisms 111 to the reaction containers 20 of the reaction outer disc mechanism 132. It may be that the at least two liquid transfer mechanisms 122 respectively transfer the reagents to at least two reaction containers 20, also may be that the at least two liquid transfer mechanisms 122 respectively transfer the reagents to the same reaction container 20, and further may be that the at least two liquid transfer mechanisms 122 add the reagents to the reaction containers 20 for multiple times or once. In this way, at least twice of reagent adding operations is able to be performed simultaneously or alternately, and thus the reagent adding time is shortened and the operation efficiency of the chemiluminescence detector is greatly improved.

Additionally, different reagents need to be added for different samples in reaction, so by adding the reagents on the reaction outer disc mechanism 132 via the at least two liquid transfer mechanisms 122, the use requirements of the different samples is able to be met. One or two liquid transfer mechanisms 122 may be selected by each sample according to actual use requirements for the reagent adding operation. The liquid transfer mechanisms 122 can adsorb the reagents in the corresponding reagent storage mechanisms 111 and are moved to corresponding positions of the reaction outer disc mechanism 132 to add the reagents the reaction containers 20. It may be understood that, since the movements of the liquid transfer mechanisms 122 between the reagent storage mechanisms 111 and the reaction outer disc mechanism 132 need a certain time, that is, the time when the liquid transfer mechanisms 122 are moved to the reagent storage mechanisms 111 to adsorb the reagents and then are moved back to the reaction outer disc mechanism 132 to add the reagents is respectively greater than the operation time of transferring the reaction containers 20 and the time of the uniformly mixing operation, the at least two liquid transfer mechanisms 122 are provided and are cooperated in operation, which can guarantee that the operations of adsorbing the reagents and adding the reagents are finished in one cycle and the reagent adding operation is performed on the reaction containers 20. Herein, the one cycle refers to the time that the reaction outer disc mechanism 132 is moved once. In this way, each of steps such as reagent adding, uniform mixing, cup taking, cup placing operations on the reaction outer disc mechanism 132 is able to be performed simultaneously, the operation time of the reaction outer disc mechanism 132 is able to be shortened, the processing efficiency of the reaction outer disc mechanism 132 is improved and thus the operation speed of a whole machine is improved. In another embodiment, the at least two reagent storage mechanisms 111 may be of an integral structure. The at least two liquid transfer mechanisms 122 can select required reagents in the reagent storage mechanisms 111 and add the reagents to the reaction containers 20 at corresponding reagent adding stations. In this embodiment, two reagent storage mechanisms 111 are provided. And correspondingly, two liquid transfer mechanisms 122 are provided.

In addition, the cooperation of double reagent bins (namely, two reagent storage mechanisms 111 and two liquid transfer mechanisms 122) is able to be more flexible to addition amounts and type selection of the reagents. The two reagent storage mechanisms 111 may add a same type or different types of reagents, and/or, the two liquid transfer mechanisms 122 also may add the reagents to the reaction containers for multiple times or a single time. When the reagents are added for the single time, the two liquid transfer mechanisms 122 need to be moved again to corresponding reagent storage mechanisms 111 to adsorb the reagents after adding the reagents sequentially. When the reagents are added for the multiple times, the two liquid transfer mechanisms 122 may add the reagents to a same reaction container or multiple reaction containers for several times after adsorbing the reagents once. In this way, the time consumed by the liquid transfer mechanisms 122 to move back and adsorb the reagents again is able to be reduced and the processing efficiency is improved. Furthermore, the two liquid transfer mechanisms 122 further may respectively add a same reagent or different reagents to a same reaction container or different reaction containers. In such a manner, an operator may adjust the two liquid transfer mechanisms 122 to transfer the reagents according to an operation condition of the whole machine so as to adapt to different use requirements.

Referring to FIG. 1 to FIG. 8, as an implementable embodiment, the reaction outer disc mechanism 132 includes a reaction outer disc supporting plate 1321 capable of being rotated. The reaction outer disc supporting plate 1321 can accommodate reaction containers 20 in which a sample is added completely and can enable the reaction containers 20 to finish a reagent adding operation and a uniform mixing operation on the reaction outer disc mechanism 132. The reaction inner disc mechanism 133 includes a reaction inner disc supporting plate 1331 capable of being rotated. The reaction inner disc supporting plate 1331 can accommodate reaction containers 20 transferred from the reaction outer disc supporting plate 1321 and can enable the reaction containers 20 to perform an incubating operation on the reaction inner disc mechanism 133. After the sample is added completely, reaction containers 20 having the sample in the buffer disc mechanism 131 are transferred to the reaction outer disc supporting plate 1321, and the liquid transfer mechanisms 122 add a reagent to the reaction containers 20 having the sample in the reaction outer disc supporting plate 1321. After the reagent is added completely, the uniform mixing operation is performed on the reaction containers 20 in the reaction outer disc supporting plate 1321, so that a mixture is uniformly mixed. After the uniform mixing operation and after the mixture is mixed uniformly, the reaction containers 20 are transferred to the reaction inner disc supporting plate 1331 and the incubating operation is performed in the reaction inner disc supporting plate 1331. After the incubating operation, the reaction containers 20 in the reaction inner disc supporting plate 1331 are transferred for a next operation.

Further, the reaction outer disc mechanism 132 further includes a reaction outer disc mounting structure 1322, and a reaction outer disc driving structure 1323 in transmission connection with the reaction outer disc supporting plate 1321. The reaction outer disc supporting plate 1321 is of a circular shape. The reaction outer disc driving structure 1323 drives the reaction outer disc supporting plate 1321 to rotate relative to the reaction outer disc mounting structure 1322.

The reaction outer disc mounting structure 1322 is configured to take supporting and mounting effects. The reaction outer disc driving structure 1323 is mounted on the reaction outer disc mounting structure 1322. The reaction outer disc supporting plate 1321 is mounted on the reaction outer disc driving structure 1323. The reaction outer disc driving structure 1323 drives the reaction outer disc supporting plate 1321 to rotate, so that the reaction outer disc supporting plate 1321 is rotated to a corresponding position and performs a corresponding operation such as a cup adding operation, a reagent adding operation, the uniform mixing operation and a cup taking operation.

Moreover, multiple placement holes 13211 are formed on the reaction outer disc supporting plate 1321. The reaction containers 20 in the buffer supporting plate is able to be respectively transferred to the multiple placement holes 13211 of the reaction outer disc supporting plate 1321. Each of the placement holes 13211 is configured to place the reaction container 20 in which the sample is added completely. Reaction containers 20 in loading holes of the buffer supporting plate are transferred to the placement holes 13211 of the reaction outer disc supporting plate 1321. It may be understood that, the placement holes 13211 may be through holes penetrating through the reaction outer disc supporting plate 1321 along an axial direction, and also may be blind holes formed on the reaction outer disc supporting plate 1321 along the axial direction. Further, the multiple placement holes 13211 are uniformly distributed along a peripheral direction of the reaction outer disc supporting plate 1321. In this way, rotating positions of the reaction containers 20 on the reaction outer disc supporting plate 1321 is able to be monitored conveniently, and the placement holes 13211 on the reaction outer disc supporting plate 1321 are rotated to corresponding positions for corresponding operations. Additionally, in this embodiment, the multiple placement holes 13211 are surrounded into a circle and are formed on a peripheral direction of the reaction outer disc supporting plate 1321.

Figure 12:
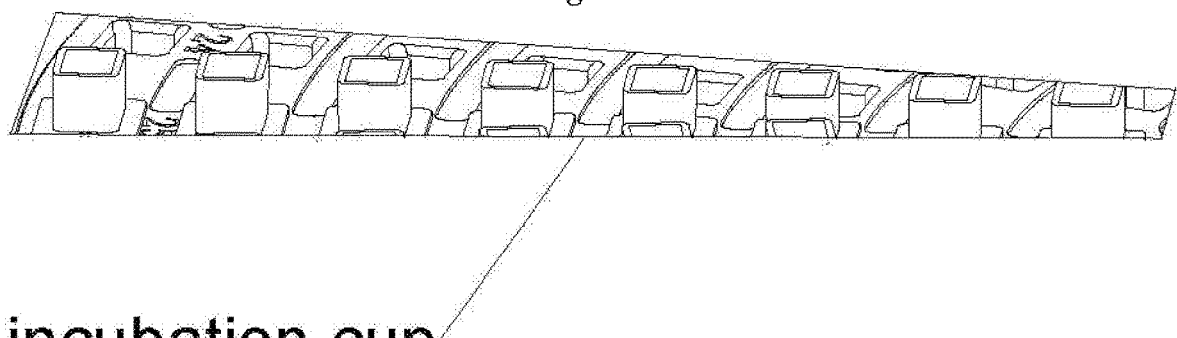
FIG. 12 is a structural schematic diagram of the incubation cup placing station shown in FIG. 3.

Further, the reaction outer disc mechanism 132 is provided with multiple reaction stations, including a cup adding station, a reagent adding station and an incubation cup taking station; the reaction inner disc mechanism 133 is provided with an incubation cup placing station (shown in FIG. 12). The buffer disc mechanism 131 is arranged corresponding to the cup adding station. Each of the reaction containers 20 in the buffer disc mechanism 131 is transferred to the reaction outer disc mechanism 132 at the cup adding station. Hence, a path that the reaction containers 20 are transferred to the reaction outer disc mechanism 132 from the buffer disc mechanism 131 is able to be shortened, and the transfer efficiency of the reaction containers 20 is improved. The liquid transfer mechanisms 122 and the reagent storage device 11 are arranged corresponding to the reagent adding station. The liquid transfer mechanisms 122 transfer the reagent in the reagent storage device 11 to the reaction containers 20 of the reaction outer disc mechanism 132 at the reagent adding station. In this way, the liquid transfer mechanisms 122 can transfer the reagent to the reaction containers 20 of the reaction outer disc mechanism 132 from the reagent storage device 11 conveniently, the transfer path of the reagent is shortened, and the transfer efficiency of the reagent is improved. The incubation cup taking station is arranged corresponding to the incubation cup placing station; each of the reaction containers 20 in the reaction outer disc mechanism 132 is taken out at the incubation cup taking station and is transferred to the reaction inner disc mechanism 133 at the incubation cup placing station. Hence, a path that the reaction containers 20 are transferred to the reaction outer disc mechanism 133 from the buffer disc mechanism 132 is able to be shortened, and the transfer efficiency of the reaction containers 20 is improved. Moreover, the chemiluminescence detector is further provided with a sample cup grabbing mechanism 162 and an incubation cup grabbing mechanism 163. That is, the cup grabbing device 16 further includes the sample cup grabbing mechanism 162 and the incubation cup grabbing mechanism 163. The sample cup grabbing mechanism 162 is arranged corresponding to the buffer disc mechanism 131 and the cup adding station of the reaction outer disc mechanism 132, and is configured to transfer reaction containers 20 in which the sample is added completely in the buffer disc mechanism 131 to the reaction outer disc mechanism 132. The incubation cup grabbing mechanism 163 is arranged corresponding to the incubation cup taking station of the reaction outer disc mechanism 132 and the incubation cup placing station of the reaction inner disc mechanism 133, and is configured to transfer the reaction containers 20 between the reaction outer disc mechanism 132 and the reaction inner disc mechanism 133. In other words, the transfer of the reaction containers 20 among the buffer disc mechanism 131, the reaction outer disc mechanism 132 and the reaction inner disc mechanism 133 is implemented via the sample cup grabbing mechanism 162 and the incubation cup grabbing mechanism 163, so that the transfer speed of the reaction containers 20 is improved.

In another embodiment, the multiple reaction stations further include a uniform mixing station. The chemiluminescence detector further includes an uniform mixing device 30. The uniform mixing device 30 is provided on the reaction outer disc mechanism 132, is arranged corresponding to the uniform mixing station and is configured to perform the uniform mixing operation on a mixture in each of the reaction containers 20 of the reaction outer disc mechanism 132. The uniformly mixing device can perform the uniform mixing operation on reaction containers 20 in which the sample and the reagent are added in the reaction outer disc mechanism 132, so that the mixture (the sample and the reagent) are fully mixed and then the incubating operation is performed. The uniform mixing device 30 is located on the reaction outer disc mechanism 132, so that the uniform mixing device 30 can perform the uniform mixing operation on the mixture in each of the reaction containers 20 in the reaction outer disc mechanism 132. Specifically, the uniform mixing device 30 includes a lifting motion mechanism and a uniform mixing mechanism. The uniform mixing mechanism is provided on the uniform mixing mechanism. The lifting motion mechanism can enable the uniform mixing mechanism to lift, so that the uniform mixing mechanism can contact a seamed edge of the reaction container 20 on a height direction. Thereafter, the uniform mixing mechanism can drive the reaction containers 20 to move so that the reaction containers 20 are shaken at a high speed and the mixture is guaranteed to be mixed uniformly. It may be understood that, the lifting motion mechanism is a slide rail structure and/or a synchronous belt structure and the like capable of lifting. The uniform mixing mechanism is a structure capable of implementing eccentric rotation. The lifting motion mechanism and the uniform mixing mechanism respectively employ a motor as a power source. Of course, in other embodiment of the present disclosure, the uniform mixing device 30 also may stir the mixture in the reaction containers 20 using a form of a stirring rod, so that the mixture is mixed uniformly.

Specifically, the reaction outer disc driving structure 1323 drives the reaction outer disc supporting plate 1321, thus driving each of the placement holes 13211 to move to the cup adding station. The sample cup grabbing mechanism 162 can transfer each of the reaction containers 20 on the buffer disc mechanism 131 to the placement hole 13211 corresponding to the cup adding station. The reaction outer disc driving structure 1323 drives the reaction outer disc supporting plate 1321, thus driving the reaction container 20 in each of the placement holes 13211 to rotate to the reagent adding station. The liquid transfer mechanism 122 adds the reagent to the reaction containers 20 of the corresponding placement holes 13211 at the reagent adding station. The reaction outer disc driving structure 1323 drives the reaction outer disc supporting plate 1321, thus driving the reaction container 20 in each of the placement holes 13211 to rotate to the uniformly mixing station. The uniform mixing device 30 uniformly mixes the mixture in the reaction container 20 in each of the placement holes 13211 corresponding to the uniform mixing station. The reaction outer disc driving structure 1323 drives the reaction outer disc supporting plate 1321, thus driving the reaction container 20 in each of the placement holes 13211 to rotate to the incubation cup taking station. The incubation cup grabbing mechanism 163 transfers the reaction container 20 in the placement hole 13211 corresponding to the incubation cup taking station to the reaction inner disc mechanism 133. Preferably, two reagent adding stations are provided and are arranged respectively corresponding to the two reagent storage mechanisms 111 and the two liquid transfer mechanisms 122, so the transfer efficiency of the reagent is improved and thus the operation speed of the instrument is improved. The two reagent adding stations are arranged respectively corresponding to the two reagent storage mechanisms 111. The liquid transfer mechanisms 122 adsorb the reagent in the corresponding reagent storage mechanisms 111 and add the reagent to the reaction containers 20 at the corresponding reagent adding stations.

Figure 13:
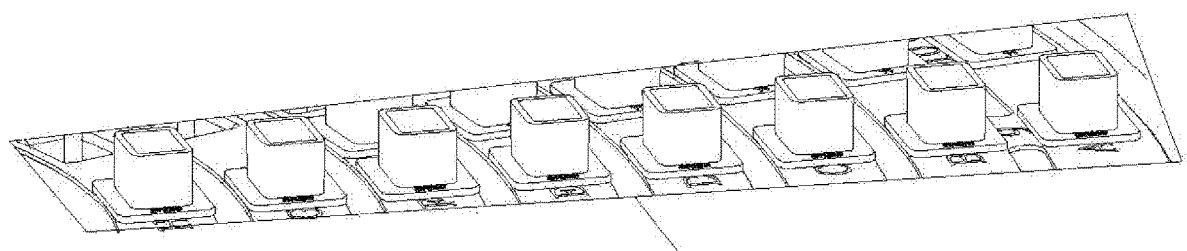
FIG. 13 is a structural schematic diagram of the cleaning cup taking station shown in FIG. 3.

Further, the reaction inner disc mechanism 133 is provided with a cleaning cup taking station (shown in FIG. 13). The multiple reaction stations further include a cleaning cup placing station. The cleaning cup placing station is located between the cup adding station and the reagent adding station. The cleaning device 14 is arranged respectively corresponding to the cleaning cup taking station and the cleaning cup placing station. Each of the reaction containers 20 in the reaction inner disc mechanism 133 is taken out at the cleaning cup taking station and is transferred to the cleaning device 14. Each of the reaction containers 20 in the cleaning device 14 is transferred to the reaction outer disc mechanism 132 at the cleaning cup placing station. Incubated samples of the reaction inner disc mechanism 133 are transferred to the cleaning device 14 via the cleaning cup grabbing mechanism 164 for a cleaning operation, so as to clean impurities in the reaction containers 20. Since some samples further need to add the reagent secondarily for reaction, the cleaning cup grabbing mechanism 164 can transfer a cleaned reaction container 20 in the cleaning device 14 to the reaction outer disc supporting plate 1321 at the cleaning cup placing station. Furthermore, when an incubated sample in the reaction inner disc mechanism 133 needs to be directly added with the reagent for the second time and even for multiple times, that is, an incubated reaction container 20 not cleaned by the cleaning device 14 is added with the reagent for the second time and even for the multiple times, the cleaning cup grabbing mechanism 164 further is able to transfer the reaction container 20 after being incubated in the reaction inner disc mechanism 133 to the reaction outer disc mechanism 132 at the cleaning cup placing station and the subsequent process is completely the same as that of the first reagent adding operation and will not be repeated here.

The cleaning device 14 is configured to remove the impurities in the reaction containers 20, so as to guarantee the accuracy of a detection result when the measuring device 15 detects a to-be-tested substance. Specifically, the cleaning device 14 includes a cleaning turntable, cleaning needle components and an adsorption piece. Multiple reaction containers 20 are uniformly spaced arranged at the periphery of the cleaning turntable. The adsorption piece is arranged at sides of revolution tracks of the reaction containers 20. The cleaning turntable is rotated and drives the reaction containers 20 to make a revolution motion around a central axis of the cleaning turntable. Under the action of the adsorption piece, the to-be-tested substance is able to be adsorbed to the sidewalls of the reaction containers 20. When the cleaning needle components clean, a detergent may be respectively injected into the cleaning needle components. Mixtures in the reaction containers 20 are separated and cleaned via the detergent. After cleaning, the cleaning needle components can adsorb and discharge waste liquor in the reaction containers 20.

It may be understood that, one or more groups of the cleaning needle components may be provided so as to clean the impurities in the reaction containers 20 once, twice, for three times and even for more times. After the impurities in the reaction containers 20 are cleaned once at least, the waste liquor is discharged finally via the cleaning needle components, and the to-be-tested substance is left for measurement or for a secondary reagent adding operation. A magnet and the like are adopted by the adsorption piece to adsorb the to-be-tested substance. The cleaning needle components and the cleaning turntable adopt a motor as a power source respectively and employ a gear transmission structure and/or a synchronous belt transmission structure and the like to implement the transfer of the motion.

Moreover, the cleaning device 14 is located at the outer periphery side of the reaction outer disc mechanism 132. When each of the reaction containers 20 is transferred among the reaction outer disc mechanism 132, the reaction inner disc mechanism 133 and the cleaning device 14, the transfer path of the reaction container 20 is able to be reduced. The chemiluminescence detector is further provided with a cleaning cup grabbing mechanism 164. That is, the cup grabbing device 16 further includes the cleaning cup grabbing mechanism 164. The cleaning cup grabbing mechanism 164 is arranged corresponding to the cleaning device 14 and the reaction outer disc mechanism 132, and is configured to transfer each of the reaction containers 20 among the reaction outer disc mechanism 132, the reaction inner disc mechanism 133 and the cleaning device 14. In other words, the cleaning cup grabbing mechanism 164 can transfer incubated reaction containers 20 in the reaction inner disc mechanism 133 to the cleaning turntable of the cleaning device 14. The cleaning cup grabbing mechanism 164 further is able to transfer reaction containers 20 that are cleaned and need to be added with the reagent again to the reaction outer disc mechanism 132.

It may be understood that, the reaction outer disc supporting plate 1321 drives reaction containers 20 thereon to rotate corresponding stations, so that a corresponding operations are performed on the reaction containers 20 at the corresponding stations, such as the reagent adding operation, the uniform mixing operation and the cup taking operation. When the reaction outer disc supporting plate 1321 is rotated to the cup adding station, the sample grabbing mechanism 162 transfers the reaction containers 20 from the buffer supporting plate to the reaction outer disc supporting plate 1321. The two reagent adding stations refer to a first reagent adding station and a second reagent adding station. Further, the cup adding station, the cleaning cup placing station, the first reagent adding station, the second reagent adding station, the uniform mixing station and the incubation cup taking station are arranged sequentially relative to the reaction outer disc supporting plate 1321. With a motion track of one reaction container 20 to illustrate the operation of the reaction outer disc supporting plate 1321, the sample grabbing mechanism 162 places the reaction container 20 in which the sample is added completely into the reaction outer disc supporting plate 1321 at the cup adding station; then, the reaction outer disc supporting plate 1321 drives the reaction container 20 to move from the cup adding station to the first reagent adding station and the second reagent adding station, and the two liquid transfer mechanisms 122 add the reagent to the reaction container 20 at the first reagent adding station and the second reagent adding station; after the reagent is added completely, the reaction outer disc supporting plate 1321 drives the reaction container 20 to move from the second reagent adding station to the uniform mixing station, and the uniform mixing device 30 mixes a mixture in the reaction container 20 uniformly at the uniform mixing station; after mixing, the reaction outer disc supporting plate 1321 drives the reaction container 20 to move from the uniform mixing station to the incubation cup taking station, and the incubation cup grabbing mechanism 163 takes out the reaction container 20 at the incubation cup taking station and transfers the reaction container 20 to the reaction inner disc supporting plate 1331; and thereafter, the reaction outer disc supporting plate 1321 is moved back to the cup adding station; and through repeating, the continuous operations are implemented.

It is to be noted that, during the actual operation of the chemiluminescence detector, the reaction outer disc mechanism 132 operates continuously. After the reaction outer disc supporting plate 1321 operates for one cycle, that is, the reaction outer disc supporting plate 1321 is rotated from one station to an adjacent station and the reaction containers 20 is added to the reaction outer disc supporting plate 1321 at the cup adding station, the liquid transfer mechanisms 122 transfer the reagent to the reaction containers 20 at the reagent adding station, and the uniform mixing device 30 uniformly mixes the mixture in the reaction containers 20 at the uniform mixing station. At the meantime, the incubation cup grabbing mechanism 163 transfers the reaction containers 20 to the reaction inner disc supporting plate 1331 at the incubation cup taking station. In other words, after the reaction outer disc supporting plate 1321 are rotated for one cycle, the cup adding operation, the reagent adding operation, the uniform mixing operation and the cup taking operation are performed simultaneously at corresponding stations.

In another embodiment, the reaction outer disc supporting plate 1321 is further provided with buffer stations relative to the chemiluminescence detector. The buffer stations are located between any adjacent two reaction stations. The buffer stations can enable spaces between adjacent two reaction stations and between the adjacent reaction station and the buffer station to be equal. It may be understood that, each of the buffer stations is a waiting station. When the reaction outer disc supporting plate 1321 is moved to the buffer stations, no any operation is performed and an operation time is able to be contributed to a to-be-performed corresponding operation.

In this embodiment, the buffer stations include a first buffer station, a second buffer station and a third buffer station. The cup adding station, the first buffer station, the cleaning cup placing station, the second buffer station, the first reagent adding station, the second reagent adding station, the uniform mixing station, the incubation cup taking station and the third buffer station are equidistantly arranged clockwise along the peripheral direction of the reaction outer disc supporting plate 1321. The reaction outer disc driving structure 1323 drives the reaction outer disc supporting plate 1321 to respectively move to the reaction stations and the buffer stations, and perform corresponding operations. It is to be noted that, at every time when the reaction outer disc driving structure 1323 drives the reaction outer disc supporting plate 1321 to rotate once, the reaction outer disc supporting plate 1321 will rotate 1/9 circle around its center, so that the reaction containers 20 on the reaction outer disc supporting plate 1321 is able to be arranged respectively corresponding to nine stations and a corresponding operation is performed via the device at the corresponding station. By adopting the above arrangement and in combination with corresponding operation structures for each station, the working efficiency of the reaction outer disc supporting plate 1321 is able to be effectively improved, the processing between the reaction outer disc supporting plate 1321 and other functional modules such as the buffer supporting plate, the liquid transfer mechanism 122 and the reaction inner disc supporting plate 1331 is more smooth, and the operation efficiency of the chemiluminescence detector is improved.

It is to be noted that, the new cup grabbing mechanism 161, the sample cup grabbing mechanism 162, the incubation cup grabbing mechanism 163, the cleaning cup grabbing mechanism 164 and the measurement cup grabbing mechanism 165 may implement the grab and the transfer of the reaction containers 20 using a cup grabbing driving component, a cup grabbing control component and a cup grabbing arm component, etc. It may be understood that, a universal control system such as a controller may be adopted by the cup grabbing control component. The cup grabbing driving component may implement motion control of the cup grabbing arm component using a driving motor in cooperation with a gear transmission component, a belt transmission component or a chain transmission component, etc., so that the cup grabbing arm component is moved on horizontal and vertical directions, and the cup grabbing arm component is guaranteed to move in place, grab and transfer the reaction containers 20. Moreover, the end portion of the cup grabbing arm component is provided with a gripper. Each of the reaction containers 20 is grabbed via the gripper.

As an implementable embodiment, the reaction outer disc mounting structure 1322 includes a reaction outer disc mounting bottom plate 13221 and a reaction outer disc support column 13222 configured to support the reaction outer disc mounting bottom plate 13221. The reaction outer disc support column 13222 can support the reaction outer disc mounting bottom plate 13221 onto a table of the chemiluminescence detector. Preferably, in this embodiment, the reaction outer disc mounting structure 1322 is mounted on the reaction inner disc mechanism 133. The reaction outer disc mounting bottom plate 13221 is supported on a reaction inner disc mounting structure 1332 of the reaction inner disc mechanism 133 via the reaction outer disc support column 13222. The reaction outer disc mounting bottom plate 13221 takes a supporting effect. The reaction outer disc driving mechanism 1323 is mounted on the reaction outer disc mounting bottom plate 13221. In another embodiment, a reaction outer disc mounting hole 13223 is formed on the reaction outer disc mounting bottom plate 13221. The reaction outer disc support column 13222 is mounted in the reaction outer disc mounting hole 13223, so that the reaction outer disc support column 13222 supports the reaction outer disc mounting bottom plate 13221 onto the reaction inner disc mounting structure 1332.

The reaction outer disc driving mechanism 1323 includes a reaction outer disc driving motor 13231 and a reaction outer disc transmission component 13232. The reaction outer disc driving motor 13231 is fixed on the reaction outer disc mounting bottom plate 13221. The reaction outer disc transmission component 13232 is in transmission connected with an output end of the reaction outer disc driving motor 13231 and the reaction outer disc supporting plate 1321. The reaction outer disc driving motor 13231 drives the reaction outer disc transmission component 13232, thereby driving the reaction outer disc supporting plate 1321 to rotate, so that each of the placement holes 13211 on the reaction outer disc supporting plate 1321 is moved to each station and a corresponding operation is performed. Preferably, the reaction outer disc transmission component 13232 includes a reaction outer disc driving wheel 132321 and a reaction outer disc synchronous bell 132322. The reaction outer disc driving wheel 132321 is mounted on the output end of the reaction outer disc driving wheel 132321. The reaction outer disc synchronous belt 132322 is provided on the reaction outer disc driving wheel 132321 and the reaction outer disc supporting plate 1321 in a sleeving manner. The reaction outer disc driving motor 13231 drives the reaction outer disc driving wheel 132321 to rotate, and the reaction outer disc driving motor 13231 drives the reaction outer disc supporting plate 1321 to rotate via the reaction outer disc synchronous belt 132322, so that the reaction outer disc supporting plate 1321 moves circumferentially, thereby implementing the effect that each of the placement holes 13211 is moved to the cup adding station, the reagent adding station, the uniform mixing station, the incubation cup taking station and the like to perform a corresponding operation. Furthermore, a toothed portion is provided on the outer wall of the reaction outer disc supporting plate 1321. The reaction outer disc supporting plate 1321 is matched with the reaction outer disc synchronous belt 132322 via the toothed portion, thereby preventing the slip of the reaction outer disc synchronous belt 132322 and guaranteeing the transmission to be reliable. Of course, in other embodiment of the present disclosure, the reaction outer disc transmission component 13232 further may be of a gear transmission structure, a chain wheel transmission structure or other transmission structures capable of implementing the rotation of the reaction outer disc supporting plate 1321.

In another embodiment, the reaction outer disc mechanism 132 further includes a guiding limit structure 1324. The guiding limit structure 1324 is provided on the reaction outer disc mounting bottom plate 13221. The guiding limit structure 1324 can perform guiding and limiting on a rotary motion of the reaction outer disc supporting plate 1321. Specifically, the guiding limit structure 1324 includes a guiding limit guide rail 13242 and rolling supports 13241. The guiding limit guide rail 13242 is of a circular shape. The reaction outer disc supporting plate 1321, the guiding limit guide rail 13242 and the reaction outer disc mounting bottom plate 13221 are laminated sequentially. The reaction outer disc supporting plate 1321 is fixed on the guiding limit guide rail 13242. The guiding limit guide rail 13242 may be rotated relative to the reaction outer disc mounting bottom plate 13221. The rolling supports 13241 are arranged on the reaction outer disc mounting bottom plate 13221 and are located outside the reaction outer disc supporting plate 1321. Each of the rolling supports 13241 is provided with a sliding chute. The guiding limit guide rail 13242 is able to be mounted in the sliding chutes of the rolling supports 13241. The rolling supports 13241 can support the guiding limit guide rail 13242 and the guiding limit guide rail 13242 is able to be slid along the sliding chutes of the rolling supports 13241, so that the rolling supports 13241 can take limiting and guiding effects. Further, at least three rolling supports 13241 are provided. The at least three rolling supports 13241 are distributed around the reaction outer disc supporting plate 1321, so that the rotation of the reaction outer disc supporting plate 1321 is guaranteed to be stable and reliable. Preferably, the three rolling supports 13241 are guiding limit bearings. Of course, in other embodiment of the present disclosure, a structure except for the limit bearing also may be adopted to implement the guiding and limiting on the guiding limit guide rail 13242. In this embodiment, there are three rolling supports 13241.

In another embodiment, the guiding limit structure 1324 further includes a lubrication component 13243. The lubrication component 13243 is fixed on the reaction outer disc mounting bottom plate 13221. Meanwhile, the periphery of the guiding limit guide rail 13242 is further clamped into a lubrication groove of the lubrication component 13243, thereby taking lubrication effect to the guiding limit guide rail 13242. Further, there are one, two, three or more lubrication components 13243. In this embodiment, there is one lubrication component 13243. Preferably, the cross section of the guiding limit guide rail 13242 is provided in a V shape. Accordingly, the sliding chutes of the rolling supports 13241 are also provided in the V shape and the corresponding lubrication groove is also provided in the V shape, thereby guaranteeing the guiding and the limiting to be reliable.

In another embodiment, the reaction outer disc mechanism 132 further includes a compaction structure 1325. The compaction structure 1325 is provided on the reaction outer disc mounting structure 1322, wherein one rolling support 13241 is mounted on the compaction structure 1325 and the compaction structure 1325 is configured to adjust a distance between the rolling support 13241 and the guiding limit guide rail 13242. Specifically, the compaction structure 1325 can drive the rolling support 13241 to move relative to the reaction outer disc mounting structure 1322, so as to adjust the distance between the guiding limit guide rail 13242 and the rolling support 13241. In this way, the matching compactness between the guiding limit guide rail 13242 and the rolling support 13241 is able to be adjusted, the rolling support 13241 is prevented from separating from the guiding limit guide rail 13242 and the distance between the rolling support 13241 and the guiding limit guide rail 13242 is reduced, and thus, the impact of the high-speed rotation of the reaction outer disc supporting plate 1321 on the rolling support 13241 and the guiding limit guide rail 13242 is eliminated, the service life is prolonged and the operation precision of the reaction outer disc supporting plate 1321 is improved; and meanwhile, the reliable support of the rolling support 13241 to the guiding limit guide rail 13242 further is able to be guaranteed, the guiding limit guide rail 13242 is operated stably and reliable and thus the reaction outer disc supporting plate 1321 is guaranteed to operate stably.

Of course, in other embodiment of the present disclosure, each of the rolling supports 13241 is corresponding to one compaction structure 1325.

Further, the compaction structure 1325 includes a compaction mounting seat 13251, a compaction elastic piece 13253 and a compaction guiding rod 13252. The compaction guiding rod 13252 is mounted on the reaction outer disc mounting structure 1322. The compaction mounting seat 13251 is slidably arranged on the compaction guiding rod 13252. The compaction elastic piece 13253 is provided on the compaction guiding rod 13252 in a sleeving manner; and two ends of the compaction elastic piece 13253 are respectively propped against the compaction guiding rod 13252 and the compaction mounting seat 13251. The rolling support 13241 is mounted on the compaction mounting seat 13251. The compaction elastic piece 13253 can enable the compaction mounting seat 13251 to move on the compaction guiding rod 13252 and is propped against the guiding limit guide rail 13242. It may be understood that, the compaction elastic piece 13253 is in a compressed state between the compaction guiding rod 13252 and the compaction mounting seat 13251. Under the action of an elastic force of the compaction elastic piece 13253, the compaction elastic piece 13253 pushes the compaction mounting seat 13251 to move to a direction far away from the compaction elastic piece 13253 along the compaction guiding rod 13252, and thus the compaction mounting seat 13251 drives the rolling support 13241 thereon to move to the guiding limit guide rail 13242. As a result, the rolling support 13241 and the guiding limit guide rail 13242 are compacted and are propped against each other. In this way, the propping state between the rolling support 13241 and the guiding limit guide rail 13242 is able to be always guaranteed, and the rolling support 13241 can take supporting, guiding and limiting effects to the guiding limit guide rail 13242, thereby guaranteeing the reaction supporting plate to operate stably.

Preferably, one end of the compaction guiding rod 13252 is provided with a lug boss. The lug boss is arranged by protruding from the surface of the compaction guiding rod 13252, and is configured to limiting a position of the compaction elastic piece 13253 on the compaction guiding rod 13252. The compaction elastic piece 13253 is provided on the compaction guiding rod 13252 in a sleeving manner. One end of the compaction elastic piece 13253 is propped against the lug boss at one end of the compaction guiding rod 13252, and the other end of the compaction elastic piece 13253 is propped against the compaction mounting seat 13251, so that the position of the compaction elastic piece 13253 is prevented from shaking and the compaction elastic piece 13253 is able to be guaranteed to reliably adjust the compaction mounting seat 13251. Furthermore, the compaction elastic piece 13253 is a spring. Of course, in other embodiment of the present disclosure, the compaction elastic piece 13253 also may be a shrapnel or other structures having elastic performance.

Still further, the compaction structure 1325 further includes a compaction fixed seat 13254. The compaction fixed seat 13254 is fixed on the reaction outer disc mounting structure 1322. The compaction guiding rod 13252 is mounted on the compaction fixed seat 13254. The compaction fixed seat 13254 takes supporting and fixing effects. The compaction guiding rod 13252 is fixed on the reaction outer disc mounting structure 1322 via the compaction fixed seat 13254 so as to reliably fix the compaction guiding rod 13252.

In another embodiment, the reaction outer disc mechanism 132 further includes a tension structure 1326. The tension structure 1326 is provided on the reaction outer disc mounting bottom plate 13221. The tension structure 1326 is propped against a reaction outer disc synchronous belt 132322. Through the tension structure 1326, the reaction outer disc synchronous belt 132322 is able to be propped all the time, so that the reaction outer disc synchronous belt 132322 is always in a tension state, thereby guaranteeing reliable transmission of the reaction outer disc synchronous belt 132322.

In one embodiment of the present disclosure, the tension structure 1326 includes a tension wheel 13261, a tension wheel shaft, a tension guiding rod 13262 and a tension elastic piece 13263. The tension guiding rod 13262 is fixed on the reaction outer disc mounting structure 1322. The tension wheel 13261 is rotationally arranged on the tension wheel shaft and the tension wheel 13261 is located outside the reaction outer disc synchronous belt 132322. One end of the tension elastic piece 13263 is fixed on the tension guiding rod 13262, and the other end of the tension elastic piece 13263 is connected with the tension wheel shaft. The tension elastic piece 13263 is able to be moved along the tension guiding rod 13262, so that the tension wheel 13261 is propped against the reaction outer disc synchronous belt 132322. The tension wheel 13261 is able to be propped against the reaction outer disc synchronous belt 132322, so when the reaction outer disc synchronous belt 132322 is rotated, the reaction outer disc synchronous belt 132322 may drive the tension wheel 13261 to rotate relative to the tension wheel shaft. In this way, the interference between the tension wheel 13261 and the reaction outer disc synchronous belt 132322 is able to be avoided, and the reaction outer disc synchronous belt 132322 is guaranteed to transmit reliably. It may be understood that, the tension elastic piece 13263 is in the compressed state. When the reaction outer disc synchronous belt 132322 is loosened, the tension elastic piece 13263 is able to be stretched along the tension guiding rod 13262. At this moment, the tension elastic piece 13263 can drive the tension wheel 13261 to move, so that the tension wheel 13261 is propped against the reaction outer disc synchronous belt 132322 all the time and thus the reaction outer disc synchronous belt 132322 is guaranteed to be always in the tension state. Preferably, the tension elastic piece 13263 is a spring. A spring sleeve is provided on the tension guiding rod 13262. Of course, in other embodiment of the present disclosure, the tension elastic piece is a shrapnel or other structures having elastic performance.

Further, the tension structure 1326 further includes a tension slide rail 13264 and a tension slide block 13265. The tension slide rail 13264 is provided on the reaction outer disc mounting structure 1322. The tension wheel shaft is fixed on the tension slide block 13265. The tension slide block 13265 is able to be slidably arranged on the tension slide rail 13264. The tension elastic piece 13263 is connected with the tension slide block 13265. The tension elastic piece 13263 can drive the tension slide block 13265 to move along the tension slide rail 13264 and drives the tension wheel shaft and the tension wheel 13261 thereon to move. When the tension elastic piece 13263 is stretched along the tension guiding rod 13262, the tension elastic piece 13263 drives the tension slide block 13265 to move. The tension slide block 13265 can drive the tension wheel shaft and the tension wheel 13261 thereon to move synchronously, such that the tension wheel 13261 can tension the reaction outer disc synchronous belt 132322. Meanwhile, the tension slide block 13265 is moved along the tension slide rail 13264 so that a movement track of the tension slide block 13265 is able to be guaranteed and the tension slide block 13265 is able to be moved along a direction toward the reaction outer disc synchronous belt 132322. Preferably, the tension slide rail 13264 is stretched toward the inside of the reaction outer disc synchronous belt 132322.

Still further, the tension structure 1326 further includes a tension connecting piece 13266. The tension connecting piece 13266 is connected to the tension slide block 13265 and the tension elastic piece 13263. The tension elastic piece 13263 drives the tension slide block 13265 via the tension connecting piece 13266 to move. Preferably, the tension connecting piece 13266 is of an L shape. One end of the L-shaped tension connecting piece 13266 is connected with the tension slide block 13265, and the other end of the L-shaped tension connecting piece 13266 is connected with the tension elastic piece 13263.

It may be understood that, when the reaction outer disc transmission component 13232 does not adopt the reaction outer disc synchronous belt 132322 for transmission, there is no need to tension the reaction outer disc transmission component 13232. In this embodiment, when the reaction outer disc synchronous belt 132322 operates, the tension wheel 13261 contacts the reaction outer disc transmission component 132322 all the time. During transmission, if the reaction outer disc transmission component 132322 has a relaxation phenomenon, the tension elastic piece 13263 is able to be stretched along the tension guiding rod 13262, the tension elastic piece 13263 drives the tension connecting piece 13266 to move and thus the tension connecting piece 13266 drives the tension slide block 13265 to slide along the tension slide rail 13264. At this moment, the tension slide block 13265 can drive the tension wheel 13261 thereon to tension the reaction outer disc synchronous belt 132322, so that the reaction outer disc synchronous belt 132322 is always in the tension state and the reaction outer disc synchronous belt 132322 is guaranteed to operate reliably.

In another embodiment, the reaction outer disc mechanism 132 further includes a reaction outer disc detection structure 1327. The reaction outer disc detection structure 1327 is provided on the reaction outer disc mounting bottom plate 13221 and is configured to initialize the reaction outer disc supporting plate 1321. The reaction outer disc detection structure 1327 includes a reaction outer disc induction piece 13271 and a reaction outer disc initialization detection piece 13272. The reaction outer disc induction piece 13271 is provided on the reaction outer disc supporting plate 1321. The reaction outer disc initialization detection piece 13272 is mounted on the reaction outer disc mounting bottom plate 13221. The reaction outer disc initialization detection piece 13272 is able to be matched with the reaction outer disc induction piece 13271 so as to detect an initial position of the reaction outer disc supporting plate 1321 to initialize the reaction outer disc supporting plate 1321. It may be understood that, the reaction outer disc initialization detection piece 13272 and the reaction outer disc induction piece 13271 detect that the initial position of the reaction outer disc supporting plate 1321 is implemented by the reaction outer disc driving motor 13231. In this way, the reaction outer disc driving motor 13231 is able to be at the initial position, so that a position of the reaction outer disc supporting plate 1321 is able to be accurately monitored via movement steps of the reaction outer disc driving motor 13231 and the reaction outer disc supporting plate 1321 moves accurately and reliably. In this embodiment, the reaction outer disc induction piece 13271 is an optically coupled induction piece. The reaction outer disc initialization detection piece 13272 may be a detection optocoupler. Of course, in other embodiment of the present disclosure, the reaction outer disc induction piece 13271 and the reaction outer disc initialization detection piece 13272 further may be a Hall switch or other parts capable of implementing initialization detection.

Referring to FIG. 1 to FIG. 3 and FIG. 9 to FIG. 11, as an implementable embodiment, the reaction inner disc mechanism 133 further includes a reaction inner disc mounting structure 1332, and a reaction inner disc driving structure 1333 in transmission connection with the reaction inner disc supporting plate 1331. The reaction inner disc supporting plate 1331 is of a discoid shape. The reaction inner disc driving structure 1333 drives the reaction inner disc supporting plate 1331 to rotate relative to the reaction inner disc mounting structure 1332. The reaction inner disc mounting structure 1332 is configured to take supporting and mounting effects. The reaction inner disc driving structure 1333 is mounted on the reaction inner disc mounting structure 1332. The reaction inner disc supporting plate 1331 is mounted on the reaction inner disc driving structure 1333. The reaction inner disc driving structure 1333 drives the reaction inner disc supporting plate 1331 to rotate, so that the reaction inner disc supporting plate 1331 is rotated to a corresponding position and performs a corresponding operation such as a cup adding operation, a reagent adding operation, the uniform mixing operation and a cup taking operation. Moreover, in this embodiment, the reaction outer disc mounting structure 1322 is mounted on the reaction inner disc mounting structure 1332.

The reaction inner disc supporting plate 1331 is of a discoid shape, and the reaction outer disc supporting plate 1321 is of a circular shape, so that the reaction outer disc supporting plate 1321 is guaranteed to be arranged outside the reaction inner disc supporting plate 1331 in a sleeving manner and the occupied space is reduced. Moreover, when the reaction outer disc supporting plate 1321 and the reaction inner disc supporting plate 1331 are respectively rotated, no interference is occurred and the movement is guaranteed to be reliable. Furthermore, multiple incubating holes 13311 for placing the reaction containers 20 are formed on the reaction inner disc supporting plate 1331. The reaction containers 20 on the reaction outer disc supporting plate 1321 are transferred to the incubating holes 13311 of the reaction inner disc supporting plate 1331 by the incubation cup grabbing mechanism 163. The reaction inner disc mechanism 133 performs an incubating operation on the reaction containers 20 in the incubating holes 13311. After a preset time, the cleaning cup grabbing mechanism 164 takes out the reaction containers 20 in the reaction inner disc supporting plate 1331 and transfers the reaction containers 20 to preset positions, namely the cleaning device 14.

Further, the multiple incubating holes 13311 are provided in lines along a radial direction of the reaction inner disc supporting plate 1331. The multiple incubating holes 13311 are distributed radioactively on the reaction inner disc supporting plate 1331. In this way, the incubating holes 13311 are arranged on the reaction inner disc supporting plate 1331 orderly, and the effect that the reaction containers 20 are added or taken out from the incubating holes 13311 at fixed positions is able to be implemented. The multiple incubating holes 13311 are provided in rows, multiple equal-radius incubating holes 13311 are distributed circularly along a connecting line on a circumferential direction and multiple circularly distributed incubating holes 13311 are arranged concentrically around a circle center of the reaction inner disc supporting plate 1331, so that the multiple incubating holes 13311 are distributed radioactively relative to the circle center of the reaction inner disc supporting plate 1331. Further, any adjacent two lines have the same incubating holes 13311. As a result, more incubating holes 13311 is able to be distributed on the reaction inner disc supporting plate 1331, and thus the addition number of the reaction containers 20 is increased, the incubating operation for multiple reaction containers 20 is able to be implemented simultaneously, the incubation speed of the reaction containers 20 is improved and the detection speed of the chemiluminescence is improved.

As an implementable embodiment, the reaction inner disc mounting structure 1332 is provided with an incubation cup placing station area and a cleaning cup taking station area. The incubation cup placing station area and the cleaning cup taking station area of the reaction inner disc mounting structure 1332 are fixedly arranged and are arranged corresponding to the reaction inner disc supporting plate 1331. The reaction inner disc driving structure 1333 drives the reaction inner disc supporting plate 1331 to rotate, and the reaction inner disc driving structure 1333 can drive the reaction inner disc supporting plate 1331 to drive each incubating hole 13311 thereon to move to a corresponding position. The incubation cup placing station area is arranged corresponding to the incubation cup grabbing mechanism 163. The incubation cup grabbing mechanism 163 grabs the reaction containers 20 on the reaction outer disc supporting plate 1321 and places the reaction containers 20 into the incubating holes 13311 of the reaction inner disc supporting plate 1331 at the incubation cup placing station area. The cleaning cup taking station area is arranged corresponding to the cleaning cup grabbing mechanism 164. The cleaning cup grabbing mechanism 164 takes out the reaction containers 20 from the reaction inner disc supporting plate 1331 at the cleaning cup taking station area. The incubation cup placing station area is arranged close to the incubation cup taking station on the reaction outer disc supporting plate 1321, so the movement path that the reaction containers 20 are moved from the reaction outer disc supporting plate 1321 to the reaction inner disc supporting plate 1331 is able to be reduced. The cleaning cup taking station area is arranged close to the cleaning device 14, so the movement path that the reaction containers 20 are moved from the reaction inner disc supporting plate 1331 to the cleaning device 14 is able to be reduced, the quick transfer of the reaction containers 20 is implemented, and the operation efficiency of the chemiluminescence detector is improved.

It may be understood that, the incubation cup placing station area and the cleaning cup taking station area both are an area arranged along a radial direction of the reaction inner disc supporting plate 1331. The incubation cup grabbing mechanism 163 can perform corresponding operations on the reaction inner disc supporting plate 1331 corresponding to the incubation cup placing station area. The cleaning cup grabbing mechanism 164 can perform corresponding operations on the reaction inner disc supporting plate 1331 corresponding to the cleaning cup taking station area, places the reaction containers 20 into any one of a column of incubating holes 13311 corresponding to the incubation cup placing station area, and takes out the reaction containers 20 from any one of a column of incubating holes 13311 corresponding to the cleaning cup taking station area. If only a circle of incubating holes 13311 are formed on the reaction inner disc supporting plate 1331, the incubation cup placing station area and the cleaning cup taking station area only are a same position.

Specifically, the reaction inner disc driving structure 1333 drives the reaction inner disc supporting plate 1331 to rotate to the incubation cup placing station area. At this moment, a column of incubating holes 13311 along a radial direction on the reaction inner disc supporting plate 1331 are corresponding to the incubation cup placing station area, and the incubation cup grabbing mechanism 163 may transfer each of the reaction containers 20 on the reaction outer disc supporting plate 1321 to any empty incubating hole 13311 at the incubation cup placing station area. The reaction inner disc driving structure 1333 drives the reaction inner disc supporting plate 1331 to rotate to the cleaning cup taking station area. At this moment, a column of incubating holes 13311 along a radial direction on the reaction inner disc supporting plate 1331 are corresponding to the cleaning cup taking station area, and the cleaning cup grabbing mechanism 164 can take out each of incubated reaction containers 20 at the cleaning cup taking station area, and transfers the reaction container to the cleaning device 14.

As an implementable embodiment, the reaction outer disc mounting structure 1332 includes a reaction inner disc mounting bottom plate 13321 and a reaction inner disc support column 13322. The reaction outer disc support column 13322 can support the reaction inner disc mounting bottom plate 13321 onto the table of the chemiluminescence detector. The reaction inner disc driving structure 1333 is installed on the reaction inner disc mounting bottom plate 13321. In another embodiment, the reaction outer disc support column 13322 and the reaction inner disc mounting bottom plate 13321 are of an integral structure. Of course, the reaction outer disc support column 13322 and the reaction inner disc mounting bottom plate 13321 are also may be provided independently. The reaction inner disc driving structure 1333 includes a rotary platform 13331 and a rotary cushion block 13332. The rotary cushion block 13332 is mounted on the rotary platform 13331. The rotary platform 13331 is further connected with the reaction inner disc supporting plate 1331. The rotary platform 13331 can drive the rotary cushion block 13332, thereby driving the reaction inner disc supporting plate 1331 to rotate; and thus the reaction inner disc supporting plate 1331 drives corresponding incubation holes 13311 to rotate to corresponding stations and corresponding operations are executed.

Preferably, the rotary platform 13331 is a device capable of rotating independently, is a combination of a motor, a guiding bearing, a gear transmission component, an electronic control component and the like, has an independent and integral power device and may be driven directly. In this embodiment, the rotary platform 13331 is provided with a rotor stretching out of the rotary platform 13331. The rotary cushion block 13332 is mounted on the rotor and can fix the reaction inner disc supporting plate 1331 on the rotor. The rotation of the rotor can drive the rotary cushion block 13332 to rotate, thereby driving the reaction inner disc supporting plate 1331 and incubation holes 13311 thereon to rotate. The rotary platform 13331 has the advantage of simple installation and maintenance, has compact structure, small size and built-in deceleration function, and can direct drive the reaction inner disc supporting plate 1331 to rotate. The rotary platform 13331 that is debugged well is able to be taken as a part to be detached and installed, which brings a great convenience for installation, debugging and maintenance of the transmission component. The rotary platform 13331 has easy disassembly and assembly and free maintenance. Of course, in other embodiment of the present disclosure, the rotary platform 13331 also may be replaced as a combination of transmission structures such as a second reaction driving motor matched gear transmission component and a synchronous belt transmission component. The output ends of the transmission structures are connected with the reaction inner disc supporting plate 1331 so as to drive the reaction inner disc supporting plate 1331 to rotate.

The reaction inner disc mechanism 133 further includes a reaction inner disc detection structure 1334. The reaction inner disc detection structure 1334 is provided on the rotary platform 13331 and can detect an initialization position of the reaction inner disc supporting plate 1331. The reaction inner disc detection structure 1334 includes a reaction inner disc detection piece 13341 and a reaction inner disc induction piece 13342. The reaction inner disc detection piece 13341 is provided on the rotary platform 13331, and the reaction inner disc induction piece 13342 is mounted on the rotor. The reaction inner disc induction piece 13342 is able to be matched with the reaction inner disc induction piece 13341 so as to detect an initial position of the reaction inner disc supporting plate 1331 to initialize the reaction inner disc supporting plate 1331 conveniently. In this embodiment, the reaction inner disc detection piece 13341 may be a detection optocoupler, and the reaction inner disc induction piece 13342 may be an optically coupled induction piece. Of course, in other embodiment of the present disclosure, the reaction inner disc detection piece 13341 and the reaction inner disc induction piece 13342 further may be a Hall switch or other parts capable of implementing position detection. It may be understood that, the reaction inner disc induction piece 13342 and the reaction inner disc detection piece 13341 detect that the initial position of the reaction inner disc supporting plate 1331 is operated and implemented by controlling the rotary platform 13331. In this way, the rotary platform 13331 is able to be at the initial position, so that a position of the reaction inner disc supporting plate 1331 is able to be accurately monitored via movement steps of the rotary platform 13331 and the reaction inner disc supporting plate 1331 moves accurately and reliably.

Preferably, the reaction inner disc supporting plate 1331 is of a hollow structure, and is provided with a rotary hole. The rotary cushion block 13332 is stretched into the rotary hole and is propped against the inner wall of the rotary hole, thereby implementing the connection between the rotary cushion block 13332 and the reaction inner disc supporting plate 1331. The rotation of the rotary platform 13331 drives the rotary cushion block 13332 to rotate, thereby driving the reaction inner disc supporting plate 1331 to rotate. In another embodiment, the rotary cushion block 13332 also is of a hollow structure, so that the rotary inertia when the rotary cushion block 13332 is rotated is able to be reduced. Furthermore, other parts of the reaction inner disc mechanism 133 further may be mounted in the rotary cushion block 13332, reducing the size of the reaction inner disc mechanism 133.

In another embodiment, the reaction inner disc mechanism 133 further includes a reaction temperature control structure 1335. The reaction temperature control structure 1335 is arranged below the reaction inner disc supporting plate 1331, and is capable of heating the reaction containers 20 in the reaction inner disc supporting plate 1331. Preferably, the reaction temperature control structure 1335 and the reaction inner disc supporting plate 1331 are mutually independent, so the momentum when the reaction inner disc supporting plate 1331 is rotated is able to be reduced, and the reaction inner disc supporting plate 1331 is guaranteed to rotate stably and reliably. In another embodiment, the reaction inner disc mounting structure 1332 further includes a reaction inner disc mounting column 13323. The reaction inner disc mounting column 13323 can take supporting effect and can support the reaction temperature control structure 1335 onto the reaction inner disc mounting bottom plate 13321. Of course, in other embodiment of the present disclosure, the reaction temperature control structure 1335 also may be fixed on the reaction inner disc supporting plate 1331.

The reaction temperature control structure 1335 can produce heat to heat the reaction inner disc supporting plate 1331, so that the temperature in the incubation holes 13311 of the reaction inner disc supporting plate 1331 is at about 37° C. In such a manner, when the reaction containers 20 are transferred to the incubation holes 13311 of the reaction inner disc supporting plate 1331, the reaction temperature control structure 1335 can provide an incubation environment for the reaction of the mixture in each of the reaction containers 20, so that the sample and the reagent is able to be guaranteed to react normally and convenience is provided for subsequent luminescence detection of the sample. Preferably, the reaction temperature control structure 1335 is of a relatively sealed structure and is configured to generate an incubation environment at about 37° C.

Specifically, the reaction temperature control structure 1335 includes a reaction heating component 13351 and a reaction heat preservation component 13352. The reaction heating component 13351 can heat the reaction inner disc supporting plate 1331, and the reaction heat preservation component 13352 can preserve the heat of the reaction inner disc supporting plate 1331. Through the joint action of the reaction heating component 13351 and the reaction heat preservation component 13352, the temperature of the reaction inner disc supporting plate 1331 is able to be kept at about 37° C., the reaction inner disc supporting plate 1331 is in a better incubation environment and the incubation effect of the sample is guaranteed.

The reaction heating component 13351 includes a constant temperature seat 133511 and a heating element 133512. The constant temperature seat 133511 is located below the reaction inner disc supporting plate 1331. The heating element 133512 is provided on the bottom of the constant temperature seat 133511. The constant temperature seat 133511 is heated via the heating element 133512 and then the constant temperature seat 133511 heats the reaction inner disc supporting plate 1331. The constant temperature seat 133511 is able to be supported onto the reaction inner disc mounting bottom plate 13321 via the reaction inner disc mounting column 13323, and other parts of the reaction temperature control structure 1335 are mounted on the constant temperature seat 133511. Preferably, the heat produced after the heating element 133512 is powered on is able to be transferred to the constant temperature seat 133511 with good heat conductivity, so that a large area of heat radiation is formed around the constant temperature seat 133511, thereby quickly heating the reaction inner disc supporting plate 1331 and compensating the heat to guarantee the heating effect of the reaction inner disc supporting plate 1331 and improve the heating efficiency. In this embodiment, the constant temperature seat 133511 is a metal constant temperature seat 133511, and the heating element 133512 is a silica gel heating tape. Of course, in other embodiment of the present disclosure, the constant temperature seat 133511 further may be other types of constant temperature structures, and the heating element 133512 further may be a heating film or other structures capable of implementing heating.

The constant temperature seat 133511 includes a constant temperature pedestal and multiple constant temperature baffle plates arranged on the constant temperature pedestal. The multiple constant temperature baffle plates are arranged annularly and have different radiuses. The multiple constant temperature baffle plates are provided in a sleeving manner layer by layer with a circle center of the constant temperature pedestal a benchmark. A space is formed between any adjacent two constant temperature baffle plates to form an annular flow channel. Through the multiple constant temperature baffle plates, the heat radiating capacity of the constant temperature seat 133511 is able to be increased, and the heating effect is guaranteed. Preferably, the distance between the any adjacent two constant temperature baffle plates is matched with the distance between two incubation holes 13311 distributed along the radial direction on the reaction inner disc supporting plate 1331, so each flow channel can heat each of the reaction containers 20 in a corresponding circle of incubation holes 13311 on the reaction inner disc supporting plate 1331. It may be understood that, each circle of incubation holes 13311 of the reaction inner disc supporting plate 1331 are corresponding to the flow channel between adjacent two constant temperature baffle plates of the constant temperature seat 133511. In this way, after the reaction containers 20 are transferred to the incubation holes 1331 of the reaction inner disc supporting plate 1331, the reaction containers 20 are stretched into the flow channel via the incubation holes 13311. The heat of the constant temperature seat 133511 can heat the reaction containers 20 and the mixture therein directly. Moreover, the space between the adjacent two constant temperature baffle plates is greater than the size of each of the reaction containers 20 along a radial direction of the reaction inner disc supporting plate 1331, so when the reaction inner disc driving structure 1333 drives the reaction inner disc supporting plate 1331 to drive the reaction containers 20 to rotate, the reaction containers 20 does not have interference with the constant temperature baffle plates.

In another embodiment, a flow groove is further formed on each of the constant temperature baffle plates. The flow grooves communicate with any adjacent two flow channels. When the rotary platform 13331 drives the reaction inner disc supporting plate 1331 to rotate, the reaction inner disc supporting plate 1331 can disturb the airflow in annular flow channels and between adjacent two annular flow channels so that the heat in each of the flow channels is accelerated to flow in the channels and between the channels, the heat in the constant temperature seat 133511 is more uniform and a good incubation environment is provided. Of course, in other embodiment of the present disclosure, each of the flow grooves may be replaced as a flow hole or other structures capable of implementing airflow circulation between any adjacent two flow channels.

The reaction heating component 13351 further includes a heating tape fixture block 133513. The heating tape fixture block 133513 is located below the heating element 133512, and is configured to fix the heating element 133512 on the constant temperature seat 133511 so as to guarantee that the position of the heating element 133512 is fixed and thus guaranteeing the healing effect. Moreover, the heating tape fixture block 133513 further is able to enable the heating element 133512 and the constant temperature seat 133511 to be attached uniformly so as to heat the constant temperature seat 133511 uniformly and efficiently. Meanwhile, the reaction heat preservation component 13352 further is able to be conveniently installed via the heating tape fixture block 133513, so that the reaction heat preservation component 13352 is attached to the constant temperature seat 133511 via the heating tape fixture block 133513 to avoid heat dissipation. Preferably, the heating tape fixture block 133513, the heating element 133512 and the constant temperature seat 133511 all are of a hollow structure. The heating tape fixture block 133513, the heating element 133512 and the constant temperature seat 133511 all are arranged on the rotary cushion block 13332 in a sleeving manner, and respectively have a preset space with the rotary cushion block 13332, so that the rotary cushion block 13332 does not drive the rotation of the heating tape fixture block 133513, the heating element 133512 and the constant temperature seat 133511.

The reaction temperature control structure 1335 further includes a temperature monitoring component. The temperature monitoring component is configured to detect the temperature of the constant temperature seat 133511 and surroundings thereof. Specifically, the temperature monitoring component further includes at least two temperature monitoring parts. The at least two temperature monitoring parts all are arranged on the constant temperature seat 133511, and the at least two temperature monitoring parts are arranged on different circumferential directions and different radial directions of the constant temperature seat 133511. It may be understood that, the at least two temperature monitoring parts have different distances to the circle center of the constant temperature seat 133511 and are located on different radius directions of the constant temperature seat 133511. In this way, the at least two temperature monitoring parts can monitor temperatures at different positions of the constant temperature seat 133511 and the surrounding environmental temperature of the constant temperature seat 133511, guaranteeing that the temperature of the constant temperature seat 133511 are accurate and reliable, and thus guaranteeing the normal incubation reaction of the sample. In this embodiment, the at least two temperature monitoring parts include a first temperature monitoring part and a second temperature monitoring part. The first temperature monitoring part and the second temperature monitoring part both are arranged on the constant temperature seat 133511. Moreover, the first temperature monitoring part and the second temperature monitoring part are arranged on different circumferential directions and different radial directions of the constant temperature seat 133511, that is, the first temperature monitoring part and the second temperature monitoring part have different distances to the circle center of the constant temperature seat 133511 and are located on different radius directions of the constant temperature seat 133511. The first temperature monitoring part and the second temperature monitoring part can monitor the temperature of the constant temperature seat 133511 as well as the surrounding air temperature, feed step data therebetween back in real time for comparison and calculates and controls a current supplied to the heating element 133512, so that the constant temperature seat 133511 forms a stable constant temperature body, the surrounding temperature of the constant temperature seat 133511 is guaranteed to be constant and the heating effect to the reaction inner disc supporting plate 1331 is guaranteed. In another embodiment, the temperature monitoring component further includes a healing sensor. The heating sensor is provided on the heating element 133512 and is configured to detect the heating temperature of the heating element 133512.

In another embodiment, the reaction inner disc mechanism 133 further includes a heat preservation cover structure 1336. The heat preservation cover structure 1336 is covered on the reaction inner disc supporting plate 1331. An incubation cup placing groove 133611 and a cleaning cup taking groove 133612 are formed on the heat preservation cover structure 1336. The incubation cup placing groove 133611 and the cleaning cup taking groove 133612 are formed along the radial direction of the reaction inner disc supporting plate 1331. The incubation cup placing groove 133611 is corresponding to the incubation cup placing station area. The cleaning cup taking groove 133612 corresponds to the cleaning cup taking station area, the incubation cup placing groove 133611 is arranged corresponding to the incubation cup taking station on the reaction outer disc supporting plate 1321 and the cleaning cup taking groove 133612 is arranged corresponding to the cleaning device 14. Through the heat preservation cover structure 1336, the heat is guaranteed not to be dissipated, and thus the temperature of the reaction inner disc supporting plate 1331 is guaranteed to be constant, and the incubation effect of the reaction inner disc mechanism 133 to the sample and the reagent in the reaction containers 20 is guaranteed. It may be understood that, the heat preservation cover structure 1336 is fixed on the reaction inner disc mounting bottom plate 13321, and the heat preservation cover structure 1336 is not rotated with the reaction inner disc supporting plate 1331, so that the incubation cup placing groove 133611 of the heat preservation cover structure 1336 is corresponding to the incubation cup placing station area all the time, the cleaning cup taking groove 133612 is corresponding to the cleaning cup taking station area all the time, and the cleaning cup grabbing mechanism 164 conveniently performs the cup taking operation, the incubation cup grabbing mechanism 163 conveniently performs the cup placing operation.

The heat preservation cover structure 1336 and the reaction heat preservation component 13352 are formed into a relatively sealed environment, so the loss of the heat is reduced and thus the incubation effect to the sample in the reaction inner disc supporting plate 1331 is guaranteed. The reaction heat preservation component 13352 includes inner wall heat preservation cottons 133522, a bottom heat preservation cotton 133521 and outer wall heat preservation cottons 133523. The bottom heat preservation cotton 133521 is located below the reaction heating component 13351, that is, below the heating tape fixture block 133513. Meanwhile, the bottom heat preservation cotton 133521 is attached to the heating tape fixture block 133513. The inner wall heat preservation cottons 133522 and the outer wall heat preservation cottons 133523 both are arranged on the bottom heat preservation cotton 133521, the inner wall heat preservation cottons 133522 are located in a rotating hole of the reaction inner disc supporting plate 1331 and are located outside the rotary cushion block 13332, and the outer wall heat preservation cottons 133523 are located outside the reaction inner disc supporting plate 1331. The inner wall heat preservation cottons 133522, the bottom heat preservation cotton 133521, the outer wall heat preservation cottons 133523 and the heat preservation cover structure 1336 are formed into a relatively sealed environment, so that the loss of the heat is reduced. Of course, in other embodiment of the present disclosure, the inner wall heat preservation cottons 133522, the bottom heat preservation cotton 133521, the outer wall heat preservation cottons 133523 further may be made of other heat preservation materials except the heat preservation cotton or use other heat preservation structures. Moreover, the reaction heat preservation component 13352 further includes a heat insulated block 133524. The heat insulated block 133524 is provided on the top of the reaction outer disc mounting column 13323, so that after the reaction inner disc mounting column 13323 is mounted, the problem that the heat is transferred via a gap is prevented and the loss of the heat is avoided. Preferably, the heat insulated block 133524 is made of a plastic material, and of course, is also may be made of other materials capable of insulating heat. Furthermore, in this embodiment, three inner wall heat preservation cottons 133522 and three outer wall heat preservation cottons 133523 are provided, in which the three inner wall heat preservation cottons 133522 are arranged on the bottom heat preservation cotton 133521 in a laminated manner, and the three outer wall heat preservation cottons 133523 are arranged on the bottom heat preservation cotton 133521 in a laminated manner. Of course, there further may be two, four and even more inner wall heat preservation cottons 133522 and outer wall heat preservation cottons 133523.

Specifically, the heat preservation cover structure 1336 includes a cover body 13361 and a cover body supporting column 13362. The cover body 13361 is provided on the cover body supporting column 13362 and is covered on the reaction inner disc supporting plate 1331. The cover body supporting column 13362 is penetrated through the rotating hole of the reaction inner disc supporting plate 1331 and is fixed on the reaction inner disc mounting bottom plate 13321, and the cover body supporting column 13362 is further provided with a hollow rotary cushion block 13332 in a penetration manner. In this way, the rotation of the rotary cushion block 13332 is able to be prevented from interfering with the cover body supporting column 13362 and the reaction supporting plate is guaranteed to rotate stably and reliably. Moreover, the incubation cup placing groove 133611 and the cleaning cup taking groove 133612 both are located on the cover body 13361.

In one embodiment of the present disclosure, the heat preservation cover structure 1336 further includes a locking component 13363. The locking component 13363 is provided on the cover body 13361 and the cover body supporting column 13362, so as to lock the cover body 13361 on the cover body supporting column 13362 and guarantee that the cover body 13361 is reliably covered on the reaction inner disc supporting plate 1331. Specifically, the locking component 13363 includes a locking piece 133631 and a lock-up piece 133632. The locking piece 133631 is movably arranged on the cover body 13361, and the lock-up piece 133632 is fixed on the top of the cover body supporting column 13362. The cover body 13361 is able to be moved to the lock-up piece 133632 and is matched with the lock-up piece 133632, thereby implementing the locking of the cover body 13361; at this moment, the cover body 13361 cannot be taken down. The locking piece 133631 is separated from the lock-up piece 133632 and the cover body 13361 is in an unlocked state; and at this moment, the cover body 13361 is able to be taken down. Further, the locking component 13363 includes a prodding piece 133633. The prodding piece 133633 is movably arranged on the cover body 13361. The prodding piece 133633 is connected with the locking piece 133631, and the prodding piece 133633 can drive the locking piece 133631 to move, so that the locking piece 133631 is locked or is separated from the lock-up piece 133632. It may be understood that, the prodding piece 133633 can drive the locking piece 133631 to move, so that the locking piece 133631 is able to be matched with the lock-up piece 133632 to lock the cover body 13361 on the cover body supporting column 13362. The prodding piece 133633 further is able to drive the locking piece 133631 to move, so that the locking piece 133631 is able to be separated from the lock-up piece 133632 and the cover body 13361 is unlocked from the cover body supporting column 13362.

Preferably, the prodding piece 133633 is a rotating part. The prodding piece 133633 includes a locking bar and an unlocking bar. The locking piece 133631 includes a rotating piece and a locking shaft connected with the rotating piece. The locking bar and the unlocking bar both are connected with the rotating piece. The lock-up piece 133632 includes a lock-up platform and a bulge arranged on the lock-up platform. The lock-up platform is able to be matched with the bulge, thereby implementing the locking of the cover body 13361. When the locking bar is moved upward, the locking bar drives the locking shaft via the rotating piece to move to the bulge and match with the bulge, thereby implementing that the cover body 13361 is locked on the cover body supporting column 13362. When the unlocking bar is moved upward, the unlocking bar drives the locking shaft via the rotating shaft to separate from the budge, thereby implementing the unlocking of the cover body 13361 from the cover body supporting column 13362. In another embodiment, the locking shaft is not limited to an axle part, and further may be other matched parts capable of locking. The budge is of an L shape and is convenient to clamp the locking shaft. Of course, the locking shaft also may be a locking groove formed on the budge. Further, a guiding inclined surface is provided on the budge so as to slide in and out the locking shaft conveniently and enable the locking shaft to match with the budge conveniently. Still further, the budge and the lock-up platform are of an integral structure. In another embodiment of the present disclosure, the prodding piece 133633 also is able to be provided in a sliding manner. By sliding the prodding piece 133633, the cooperation and separation between the locking piece 133631 and the lock-up piece 133632 are implemented, being convenient for operation. Of course, in other embodiment of the present disclosure, the locking component 13363 also may be fixed on the cover body supporting column 13362 via a screw element.

In another embodiment, the heat preservation cover structure 1336 further includes a core cover 13364. A fixing hole is formed on a middle area of the cover body 13361. The prodding piece 133633 and the locking piece 133631 are arranged on the core cover 13364. The core cover 13364 and the cover body 13361 are enclosed into an annular groove. The prodding piece 133633 is able to be moved to an annular groove, thereby implementing the locking and unlocking of the cover body 13361. Specifically, when the unlocking bar is located in the annular groove, the locking bar is located above the core cover 13364. At this moment, the cover body 13361 is locked on the cover body supporting column 13362. When the locking bar is located in the annular groove, the unlocking bar is located above the core cover 13364 and the cover body 13361 is unlocked. It may be understood that, through the annular groove, the positions of the unlocking bar and the locking bar are able to be fixed and do not shake easily, thereby guaranteeing that the locking and unlocking states of the cover body 13361 are reliable. Of course, in other embodiment of the present disclosure, the cover body 13361 and the core cover 13364 also may be of an integral structure, and an annular groove is provided, thereby limiting the prodding piece 133633.

Moreover, the heat preservation cover structure 1336 further includes a detection cover piece and a cover body 13361 induction piece. The cover body 13361 induction piece is provided on the cover body 13361, and the detection cover piece is provided on the top of the cover body supporting column 13362. The detection cover piece can detect the position of the cover body 13361 induction piece, so as to determine whether the cover body 13361 is covered. It may be understood that, the detection cover piece can sense the cover body 13361 induction piece, which indicates that the cover body 13361 is covered on the reaction inner disc supporting plate 1331. If the detection cover piece cannot sense the cover body 13361 induction piece, it indicates that the cover body 13361 is far away from the reaction supporting plate or the cover body 13361 is not covered on the reaction inner disc supporting plate 1331 well. Preferably, the detection cover piece is a detection cover sensor, and the cover body 13361 induction piece is an induction magnet. Of course, in other embodiment of the present disclosure, the detection cover piece and the cover body 13361 induction piece further may be other matched structure capable of implementing whether the cover body 13361 is covered well. The heat preservation cover structure 1336 further includes a core heat preservation cotton 13368. The core heat preservation cotton 13368 is arranged between the inside of the rotary cushion block 13332 and the cover body supporting column 13362, so as to prevent the loss of the heat between the cover body 13361 and the reaction inner disc supporting plate 1331. Preferably, at least one core heat preservation cotton 13368 is provided, so that the core heat preservation cotton 13368 is filled in a space inside the rotary cushion block 13332 on a height direction to guarantee the heat preservation effect. In this embodiment, three core heat preservation cottons 13368 are provided. The three core heat preservation cottons 13368 are provided inside the rotary cushion block 13332 in a laminated manner. Of course, there further may be two, four and even more core heat preservation cottons 13368.

In another embodiment, the heat preservation cover structure 1336 further includes a fixing component 13367. The fixing component 13367 is connected to the reaction heat preservation component 13352 and the cover body 13361 and can fix the cover body 13361 on the outer wall heat preservation cottons 133523 of the reaction heat preservation component 13352. Specifically, the fixing component 13367 includes annular external pressure blocks 133671 and guide pins 133672. The annular external pressure blocks 133671 are arranged between the cover body 13361 and the outer wall heat preservation cottons 133523. Through the annular external pressure blocks 133671, the sealing between the cover body 13361 and the outer wall heat preservation cottons 133523 is able to be guaranteed, and the heat is prevented from being lost between the cover body 13361 and the outer wall heat preservation cottons 133523. Moreover, guide mounting grooves are formed on the cover body 13361. The guide pins 133672 are penetrated through the guide mounting grooves and are mounted on the annular external pressure blocks 133671, so that the cover body 13361 is fixedly connected with the annular external pressure blocks 133671 and thus the cover body 13361 and the annular external pressure blocks 133671 are guaranteed to be fixed reliably. In another embodiment, the fixing component 13367 further includes an annular internal pressure blocks 133673. The annular internal pressure blocks 133673 are arranged between the cover body 13361 and the inner wall heat preservation cottons 133522, thereby guaranteeing the sealing between the cover body 13361 and the inner wall heat preservation cottons 133522, preventing the heat from being lost between the cover body 13361 and the inner wall heat preservation cottons 133522, and simultaneously limiting upward degree of freedom of each of the inner wall heat preservation cottons 133522. In another embodiment, at least two cover body supporting columns 13362 are provided, so that the core cover 13364 is able to be reliably fixed on the reaction mounting bottom plate and thus the cover body 13361 is reliably fixed on the reaction mounting bottom plate.

In another embodiment, the heat preservation cover structure 1336 further includes an observation cover 13369. An observation window is further formed on the cover body 13361. The cover body 13361 is located in the observation window of the observation cover 13369 in a switchable manner, so that the operator can observe the operation condition of the reaction inner disc supporting plate 1331 conveniently and simultaneously the reaction containers 20 are cleaned manually and conveniently. In this embodiment, one end of the observation cover 13369 is rotationally fixed on the cover body 13361, and the other end of the observation cover 13369 is able to be rotated around one end of the observation cover 13369, thereby opening or closing the observation window. In another embodiment, the heat preservation cover structure 1336 further includes a turn-lock clasp. The other end of the observation cover 13369 is screwed to the cover body 13361 via the turn-lock clasp. When there is a need for observation, the turn-lock clasp is unscrewed so that the observation cover 13369 is able to be opened. When there is no need for observation, the observation cover 13369 is able to be fixed on the cover body 13361 via the turn-lock clasp, so that the observation cover 13369 is prevented from being opened freely. Of course, in another embodiment of the present disclosure, the observation cover 13369 also may be a transparent window so as to observe directly and conveniently. At this moment, the observation cover 13369 and the cover body 13361 are of an integral structure. Of course, in a still another embodiment, the whole cover body 13361 also may be made of a transparent material, that is, the cover body 13361 is transparent. At this moment, there is no longer need to arrange the observation cover 13369 on the cover body 13361. The operator may observe the operation condition in the whole reaction inner disc supporting plate 1331 via the transparent cover body 13361.

As an implementable embodiment, the measuring device 15 is configured to detect the to-be-tested substance in the reaction containers 20 so as to obtain corresponding detection parameters of the sample. Specifically, the measuring device 15 includes a bottom plate, an inner shell, an outer shell, an upper cover, a measurement turntable, a driving mechanism, a first substrate spray nozzle, a second substrate spray nozzle, a photomultiplier detection component and a waste liquor adsorption needle component. The bottom plate, the outer shell and the upper cover are enclosed into a holding space of the measuring device 15. The measurement turntable and the inner shell are located in the holding space. The bottom plate, the outer shell, the inner shell, the upper cover and the measurement turntable are formed into a darkroom. The measuring device 15 is further provided with multiple reaction container processing stations. The multiple reaction container processing stations are sealed in a mutually light-isolated manner. In the present disclosure, with four reaction container processing stations as an example for illustration, the four reaction container processing stations are sealed in the mutually light-isolated manner. During measurement,

- a first reaction container processing station (a reaction container 20 entering station): the reaction containers 20 are placed into or taken out from the measuring device 15 at the first reaction container processing station
- a second reaction container processing station (an excitation substrate I adding station): the first substrate nozzle is arranged at the second reaction container processing station so as to add an excitation substrate I to the reaction containers 20.
- a third reaction container processing station (a reaction container 20 measuring station): the second substrate nozzle is arranged at the third reaction container processing station so as to add an excitation substrate II to the reaction containers 20; and the photomultiplier detection component is arranged at the third reaction container processing station.
- a fourth reaction container processing station (a waste liquor pumping station): the waste liquor adsorption needle component is arranged at the fourth reaction container processing station so as to pump the waste liquor in the reaction containers 20.

The first reaction container processing station, the second reaction container processing station, the third reaction container processing station and the fourth reaction container processing station are arranged sequentially along an auto-rotation direction of the measurement turntable and are sealed in the mutually light-isolated manner; the first reaction container processing station and the third reaction container processing station are arranged diagonally and the second reaction container processing station and the fourth reaction container processing station are arranged diagonally. The structural settings of the bottom plate, the inner shell, the outer shell, the upper cover and the measurement turntable are matched with the function of each of the reaction container processing stations and the used mechanism thereof. The driving mechanism is configured to drive the measurement turntable to rotate. The driving mechanism adopts a motor and the like as a power source and implements the transfer of the power using a gear transmission mechanism, thereby driving the measurement turntable to rotate.

In another embodiment, the measuring device 15 further includes a light isolation component. Through the light isolation component, each of the reaction container processing stations is isolated so as to guarantee the light isolation performance. Further, the light isolation component implements the light isolation using a light isolation plate or other structures implementing the light isolation.

Furthermore, the measuring device 15 is located at the outer periphery side of the reaction outer disc mechanism 132 and is arranged adjacent to the cleaning device 14. The processing flows vary for different samples. Some samples are measured via the measuring device 15 directly after being cleaned, some samples need to be transferred to the reaction device 13 after being cleaned for operations such as secondary reagent adding, and some samples are directly measured without being cleaned. Therefore, the measuring device 15 and the cleaning device 14 are located at the outer periphery side of the reaction outer disc mechanism 132, and the measuring device 15 and the cleaning device 14 are arranged adjacently, so when the reaction containers 20 are transferred among the measuring device 15, the cleaning device 14, the reaction inner disc mechanism 133 and the reaction outer disc mechanism 132, the transfer path of the reaction containers 20 is able to be shortened, the transfer speed of the reaction containers 20 is improved and thus the operation efficiency of the chemiluminescence detector is improved. The chemiluminescence detector is further provided with a measurement cup grabbing mechanism 165, that is, the cup grabbing device 16 further includes the measurement cup grabbing mechanism 165. The measurement cup grabbing mechanism 165 is arranged corresponding to the cleaning device 14 and the measuring device 15 and is configured to transfer reaction container 20 after being cleaned in the cleaning device 14 to the measuring device 15. In other words, the measurement cup grabbing mechanism 165 can transfer reaction containers 20 in which impurities are cleaned on the cleaning turntable to the measurement turntable of the measuring device 15, and drives the reaction containers 20 via the measurement turntable to successively rotate around each of the reaction container processing stations, thereby detecting the to-be-tested substance in the reaction containers 20 to obtain detection parameters of the sample.

As an implementable embodiment, the chemiluminescence detector further includes a sample conveying device 19 configured to convey the sample to a sample suction position, the sample suction position is arranged at a periphery side of the buffer disc mechanism 131 and corresponding to the sample adding mechanism 121; and the sample adding mechanism 121 sucks up the sample at the sample suction position and transfers the sample to reaction containers 20 of the buffer disc mechanism 131. The sample conveying device 19 is configured to convey a to-be-tested sample and implement automatic conveying of the to-be-tested sample so as to improve the sample supply efficiency. Moreover, the sample conveying device 19 conveys the sample to the sample suction position, and the sample adding mechanism 121 sucks up the sample at the sample suction position and transfers the sample to the reaction containers 20 of the buffer disc mechanism 131, so that the transfer distance of the sample is able to be shortened and the transfer efficiency of the sample is improved.

Specifically, the sample conveying device 19 includes a sample storage mechanism 191 and a sample conveying mechanism 192 detachably connected with the sample storage mechanism 191; multiple sample racks loaded with samples are stored in the sample storage mechanism 191; the sample storage mechanism 191 transfers each of the sample racks to the sample conveying mechanism 192; and the each of the sample racks is conveyed by the sample conveying mechanism 192 to the sample suction position. The sample conveying device 19 further includes a sample transfer mechanism. Through sample transfer mechanism, the sample racks in the sample storage mechanism 191 is able to be transferred to the sample conveying mechanism 192. The sample storage mechanism 191 is provided with delivery ports, through which the sample racks are transferred to the sample transfer mechanism; and through the sample transfer mechanism, the sample racks are transmitted to the sample conveying mechanism 192. The conveying mechanism 192 includes a rail component and a rail changing structure. The sample transfer mechanism is able to be in abutment joint with transmission channels of the rail component, so that the rail component conveys the sample to the sample suction position. The rail component implements the conveying of the sample racks using a synchronous belt structure and the like. Through the rail changing structure, the sample racks are transferred among the multiple transmission channels of the rail component. In another embodiment, the sample transfer mechanism includes a ferry trolley, through which the sample storage mechanism 191 communicates with the transmission channels. Of course, the sample transfer mechanism further may be a structure capable of implementing the transfer of the sample racks such as a transfer rail or a grabbing structure. Moreover, in other embodiment of the present disclosure, the sample conveying device 19 further may implement the conveying of the sample using a manner of sample plates.

When the sample conveying device 19 transmits the sample, the operator places the sample racks loaded with the to-be-tested sample into the sample storage mechanism 191. The sample storage mechanism 191 is mounted on an instrument body of the chemiluminescence detector via a connecting structure such as a support piece and a suspension piece. The ferry trolley selects to-be-tested sample racks, loads the sample racks to the transmission channels of the rail component of the sample conveying mechanism 192, and conveys the sample racks to the sample suction position via the rail component. After the sample adding mechanism 121 takes the sample completely, the rail changing structure changes transmission channels of the sample racks in which the sample is taken completely, so as to transmit the sample racks in which the sample is taken completely to an input end of the sample conveying structure and convey the sample racks in which the sample is taken completely to the sample storage mechanism 191 via the ferry trolley. The operator recycles the sample racks in which the sample is taken completely in the sample storage mechanism 191.

When multiple chemiluminescence detectors are spliced in use, an input end of the sample conveying mechanism 192 is able to be in abutment joint with the sample storage mechanism 191, or is able to be in abutment joint with an output end of a sample conveying mechanism 192 of another chemiluminescence detector; and an output end of the sample conveying mechanism 192 is able to be in abutment joint with an input end of a sample conveying mechanism 192 of a still another chemiluminescence detector. In other words, through the sample storage mechanism 191 of one chemiluminescence detector, the sample is transmitted to the sample conveying mechanisms 192 of the multiple chemiluminescence detectors, thereby implementing stream line operation. With three spliced chemiluminescence detectors as an example for illustration, the input end of a sample conveying mechanism 192 of a first chemiluminescence detector is able to be in abutment joint with the sample storage mechanism 191, an output end of the sample conveying mechanism 192 of the first chemiluminescence detector is able to be in abutment joint with an input end of a sample conveying mechanism 192 of a second chemiluminescence detector, and an output end of the sample conveying mechanism 192 of the second chemiluminescence detector is able to be in abutment joint with an input end of a sample conveying mechanism 192 of a third chemiluminescence detector. Through the sample storage mechanism 191 of the first chemiluminescence detector, the samples are conveyed to the three chemiluminescence detectors.

As an implementable embodiment, the sample adding mechanism 121 includes a linear sliding table, a sample adding module and a rotary cantilever, wherein the sample adding module is configured to add a sample. Generally, a liquid suction head is provided on the sample adding module so as to take the sample. In the present disclosure, the sample adding module is an ADP module, namely, an air-displacement pipetting module. In other embodiment, the sample adding module also may be a sample adding module composed of a steel needle, a liquid path and a plunger pump. The sample adding module is mounted on the rotary cantilever. Through the rotary cantilever, the sample adding module is supported and simultaneously the sample adding module is driven to rotate around a center of the rotary cantilever. The rotary cantilever is slidably mounted on the linear sliding table through which the rotary cantilever is driven to move linearly. Specifically, the linear sliding table is of a slide rail and slide block structure and/or a synchronous belt structure, and the like, thereby driving the rotary cantilever to move linearly. In this way, the linear sliding table is matched with the rotary cantilever, so after the sample adding module sucks up the samples at the sample suction position, the sample is transferred to the reaction containers 20 of the buffer disc mechanism 131.

Since the liquid suction head on the sample adding module is a disposable consumable, in order to guarantee the continuity of the sample, there is a need to automatically transmit the liquid suction head. Therefore, the chemiluminescence detector further includes a consumable box loading device 18 configured to automatically transmit consumable storage boxes loaded with liquid suction heads; the consumable box loading device 18 further is able to transmit the consumable storage boxes to each of loading positions; and the sample adding mechanism 121 loads the liquid suction heads at the loading positions and transfers the sample via the liquid suction heads. The liquid suction heads are filled in the consumable storage boxes. The consumable box loading device 18 includes a consumable box holding bin, a consumable box buffer bin, a consumable box conveying mechanism and a consumable box clamping mechanism. The consumable box conveying mechanism implements movement on horizontal and vertical directions using the synchronous belt structure and the like, so that the consumable box storage boxes are able to be transmitted to each of the loading positions. The consumable box clamping mechanism can convey the consumable boxes among the consumable box holding bin, the consumable box buffer bin and the consumable box conveying mechanism. In this embodiment, the liquid suction heads are TIP heads which are disposable suction heads for sampling.

The operator manually places the consumable storage boxes filled with the liquid suction heads into the consumable holding bin; and two buffer frames on the consumable box buffer bin are empty. The consumable box clamping mechanism clamps one consumable storage box in the consumable holding bin to place onto a transportation frame of the consumable conveying mechanism, the transportation frame conveys the consumable storage box to each of the loading positions, and at the loading positions, the consumable storage box is able to be loaded and located, so that the sample adding module of the sample adding mechanism 121 performs liquid suction head loading at the each of the loading positions. The consumable box clamping mechanism clamps one consumable storage box in the consumable box holding bin to place onto a first buffer frame of the consumable box buffer bin after clamping one consumable storage box to place onto the transportation frame. After the liquid suction heads in the consumable storage at the loading position are used up, the transportation frame transports empty consumable storage box back, and the consumable box clamping mechanism clamps the empty consumable storage box to place into a second buffer frame on the consumable box buffer bin. After the empty consumable storage box is placed into the second buffer frame on the consumable box buffer bin, the consumable box clamping mechanism clamps the consumable storage box in the first buffer frame to place onto the transportation frame and the transportation frame conveys the consumable storage box. The consumable box clamping mechanism clamps the empty consumable storage box in the second buffer frame to place onto the consumable box holding bin. The consumable box clamping mechanism clamps a new consumable storage box filled with the liquid suction heads from the consumable box holding bin to place into the first buffer frame of the consumable box holding bin. By repeating the above actions, the consumable storage boxes are continuously loaded. It may be understood that, when the whole consumable box holding bin is filled with empty consumable storage boxes, the consumable box holding bin is able to be pulled out directly, so that the user takes the empty consumable boxes away and loads new consumable boxes in the consumable box holding bin. After being loaded, the consumable box holding bin is pushed in, the consumable box clamping mechanism clamps the consumable storage boxes and the above operation are performed repeatedly. Since two buffer frames are provided, after the consumable box holding bin is pulled out, the loading and recycling of the consumable storage boxes further is able to be implemented inside the instrument, thus implementing continuous loading.

Further, the consumable box loading device 18 is located at the outer periphery side of the buffer disc mechanism 131 far away from the reaction container automatic transmission device 17 and is arranged corresponding to the sample adding mechanism 121. In this way, the transmission path of the consumable storage boxes are able to be shortened, the occupied space is reduced and the overall size of the chemiluminescence detector is reduced.

As an implementable embodiment, the chemiluminescence detector further includes a pedestal 10. The pedestal 10 is provided with a supporting platform. The reaction device 13, the measuring device 15, the cleaning device 14, the separate injection device 12 and the reagent storage device 11 all are arranged on the supporting platform of the pedestal 10. The reagent storage device 11, the consumable box loading device 18, and the sample conveying mechanism 192 and the sample storage mechanism 191 of the sample conveying device 19 are respectively arranged at the four sides of the supporting platform, and are located at edge positions of the supporting platform. The reaction container automatic transmission device 17 is located between the consumable box loading device 18 and the buffer disc mechanism 131 of the reaction device 13. As shown in FIG. 1, two reagent storage mechanisms 111 of the reagent storage device 11 are located at front edge positions of the supporting platform, the consumable box loading device 18 is located at a left edge position of the supporting platform, the sample storage mechanism 191 is located at a right edge position of the supporting platform and the sample conveying mechanism 192 is located at a rear edge position of the supporting platform. The reaction outer disc mechanism 132 is located in a middle area of the supporting platform, the buffer disc mechanism 131, the reaction container automatic transmission device 17, the measuring device 15 and the cleaning device 14 are arranged at the outer periphery side of the reaction outer disc mechanism 132, the sample adding mechanism 121 is located between the buffer disc mechanism 131 and the sample conveying mechanism 192, and the uniform mixing device 30 is provided on the reaction outer disc mechanism 132, and is arranged corresponding to the uniform mixing station. Since a main operation surface of the sample storage mechanism 191 is on the right, the operator loads the sample racks to the sample storage mechanism 191 from the right, the sample racks are taken out by the ferry trolley from the sample storage mechanism 191, are sent to the sample conveying mechanism 192 at the rear side of the instrument and are conveyed to the sample suction position, and the samples are adsorbed by the sample adding mechanism 121. After the sample is adsorbed completely, the sample racks are sent via the ferry trolley from the sample conveying mechanism 192 to the sample storage mechanism 191 and are taken out by the operator.

Further, the chemiluminescence detector further includes a control device and a liquid path device, the control device is electrically connected with the reaction device 13, the measuring device 15, the cleaning device 14, the separate injection device 12 and the reagent storage device 11; the liquid path device is connected with the separate injection device 12; the pedestal 10 is further provided with a holding space; the holding space is located below the supporting platform; and the control device and the liquid path device are provided in the holding space. The control device is configured to implement automatic control on each part of the chemiluminescence detector, so that the each part can implement an automatic operation and the working efficiency is improved. The liquid path device communicates with the liquid transfer mechanisms 122 as well as a primary cleaning mechanism and a secondary cleaning mechanism of the cleaning device 14, so as to provide a cleaning fluid for the liquid transfer mechanisms 122, the primary cleaning mechanism and the secondary cleaning mechanism or discharge the waste liquor.

Moreover, an upper portion of the reaction container automatic transmission device 17 is located above the supporting platform, and the lower portion of the reaction container automatic transmission device 17 is located below (namely in the holding space) of the supporting platform. Specifically, the drawer mechanism, the reaction container storage mechanism and the second reaction container recycling mechanism are provided in the holding space, and the reaction container lifting mechanism and the first reaction container recycling mechanism are located above the supporting platform. When the drawer mechanism is pulled out, the reaction container boxes are loaded to the reaction container storage mechanism and the reaction container boxes are recycled in the second reaction container recycling mechanism, the reaction container lifting mechanism and the first reaction container recycling mechanism still can implement the loading and recycling of the reaction container boxes and implements continuous loading and continuous recycling of the reaction container boxes, so that the instrument can operate normally. The supporting platform can support the reaction container lifting mechanism and the first reaction container recycling mechanism, thereby facilitating the operation when the drawer mechanism is pulled out. The holding space further is able to hold the drawer mechanism, the reaction container storage mechanism and the second reaction container recycling mechanism, so that the space is utilized reasonably and the overall size is guaranteed.

The present disclosure further provides a detection method of the chemiluminescence detector. The detection method is based on the chemiluminescence detector in the above embodiments. The detection method includes the following steps:
  a sample adding step, a sample is respectively transferred to reaction containers 20;
  a reagent adding step: a reagent is respectively transferred to the reaction containers 20;
  a uniform mixing step: a mixture in each of the reaction containers 20 is uniformly mixed;
  an incubating step: an incubating operation is performed on the mixture after being uniformly mixed in each of the reaction containers 20;
  a separating and cleaning step: impurities in each of the reaction containers 20 after incubation are removed; and
  a measuring step: a to-be-tested substance in each of the reaction containers 20 is detected.

When the chemiluminescence detector of the present disclosure detects the sample, the reaction container automatic transmission device 17 transmits the reaction container boxes to a reaction container locating and dropping mechanism, and the consumable box loading device 18 conveys consumable storage boxes to loading positions. The sample conveying device 19 transmits sample racks to the sample suction position via a sample conveying mechanism 192 in a sample storage mechanism 191. Reaction containers 20 in the reaction container boxes are transferred to the buffer disc mechanism 131 via a new cap grabbing mechanism 161 for later use. A sample adding module of a sample adding mechanism 121 loads a new TIP head, and sucks up the sample at a sample suction position and transfers the sample to one or more reaction containers 20. A sample cup grabbing mechanism 162 transfers the reaction containers 20 in the buffer disc mechanism 131 to a reaction outer disc mechanism 132; a reaction outer disc supporting plate 1321 drives each of the reaction containers 20 to move to a reagent adding station, and a plurality of liquid transfer mechanisms 122 suck up the reagent in the reagent storage mechanism 111 and transfer the reagent to the reaction containers 20 at the reagent adding station, the reaction outer disc supporting plate 1321 drives the reaction containers 20 to move to a uniform mixing station, and an uniform mixing device 30 drives the reaction containers 20 to vibrate at a fixed frequency, so as to uniform mix the mixture in the reaction containers 20, the reaction containers after being uniformly mixed 20 are transferred to the reaction inner disc mechanism 133 from an incubation cup grabbing mechanism 163 for an incubating operation, so that the sample and the reagent are fully reacted, the reaction containers after being incubated 20 are transferred to the cleaning device 14 from a cleaning cup grabbing mechanism 164 for a cleaning operation, thereby removing impurities in the reaction containers 20, the reaction containers after being cleaned 20 are transferred to a measuring device 15 from a measurement cup grabbing mechanism 165 for a measuring operation, thereby detecting the to-be-tested substance in the reaction containers after being cleaned 20.

The detection method includes a sample testing method and a system testing method. The above detection method is the sample testing method. The system testing method is described hereinafter. The system testing includes a background measurement and a light inspection measurement. When the background measurement is performed by the chemiluminescence detector, each of empty reaction containers 20 is sent to the cleaning device 14; the reaction containers after being cleaned are transferred to the measuring device 15 via the measurement cup grabbing mechanism 165; and the measuring device 15 adds a substrate solution to the reaction containers 20 and measures a background illuminate value. When the light inspection measurement is performed by the chemiluminescence detector, a quantitative amount of complex carrying a illuminate marker is added to the reaction containers 20 in the reaction device 13; the reaction containers without being cleaned are directly transferred to the measuring device 15; and the measuring device 15 adds the substrate solution to each of the reaction containers 20 and measures its illuminate value.

Further, the detection method further includes the following steps:
  before the separating and cleaning step, at least one cycle of the reagent adding step, the uniform mixing step and the incubating step is repeatedly executed; and/or
  before the measuring step, at least one cycle of the reagent adding step, the uniform mixing step, the incubating step and the separating and cleaning step is repeatedly executed.

It is to be noted that, when the chemiluminescence detector detects the sample, there has a one-step method, a two-step method, a three-step method and a four-step method according to a reagent adding times. The one-step method refers to add the reagent once, the two-step method refers to add the reagent twice, the three-step method refers to add the reagent for three times, and the four-step method refers to add the reagent for four times. The uniform mixing and incubating operations need to be performed every time after the reagent is added. Moreover, before the incubating operation, the uniform mixing operation may be performed and also may not be performed.

Furthermore, the cleaning operation may be performed and also may not be performed between adjacent two reagent adding times. When the cleaning operation is performed, the reaction containers 20 are transferred by the cleaning cup grabbing mechanism 164 from the reaction inner disc mechanism 133 to the cleaning device 14, and the reaction containers after being cleaned 20 are transferred via the cleaning cup grabbing mechanism 164 from the cleaning device 14 to a cleaning cup placing station of the reaction outer disc mechanism 132 for subsequent reagent adding operation; when the cleaning operation is not performed, the cleaning cup grabbing mechanism 164 directly transfers the reaction containers 20 in the reaction inner disc mechanism 133 to a cleaning cup placing station of the reaction outer disc mechanism 132 for subsequent reagent adding operation. Moreover, before the measuring device 15 detects the to-be-tested substance in the reaction containers 20, the separating and cleaning operation must be performed via the cleaning device 14 so as to remove the impurities of the reaction containers 20 and guaranteeing that the detection results of the measuring device 15 are accurate and reliable.

Additionally, when some sample is detected, there further has a need to add a pretreatment reagent so as to guarantee the accuracy of a sample detection result. Herein, the pretreatment reagent refers to a liquid, a solid or a mixture and the like added before the reagent is added formally. Therefore, the detection method further includes the following steps: before the reagent adding step, the pretreatment reagent is transferred to the reaction containers. In other words, the detection method further includes a pretreatment reagent adding step; the pretreatment reagent is stored in the reagent storage mechanism and the pretreatment reagent operation is implemented by the liquid transfer mechanisms 122. After the liquid transfer mechanisms 122 transfer the pretreatment reagent to the reaction containers, the reaction outer disc mechanism 132 drives the reaction containers to rotate with a circle and then the reagent adding operation and subsequent corresponding operations are performed. It is to be noted that, in the process that the reaction outer disc mechanism 132 drives reaction containers in which the pretreatment reagent is added completely to rotate with one circle, the uniform mixing step and the incubating step are not performed.

In the present disclosure, the above sample detection process is described only with the three-step method. One condition is as follows: after the sample is added to the reaction containers 20 and the reagent adding step, the uniform mixing step and the incubating step are repeated and successively performed for three times, the separating and cleaning operation is performed on the impurities in the reaction containers 20 and then the measurement operation is performed on the to-be-tested substance in the reaction containers 20. Another condition is as follows: after the sample is added to the reaction containers 20 and the reagent adding step, the uniform mixing step, the incubating step and the separating and cleaning step are repeated and successively performed for three times, the measurement operation is performed on the to-be-tested substance in the reaction containers 20. A still another condition is as follows: after the sample is added to the reaction containers 20, the reagent adding step, the uniform mixing step and the incubating step are performed successively, and the reagent adding step, the uniform mixing step, the incubating step and the separating and cleaning step are repeated and successively performed for twice, the measurement operation is performed on the to-be-tested substance in the reaction containers 20.

Further, before the measuring step, at least one separating and cleaning operation is performed on the impurities in the reaction containers 20 after the incubation during the separating and cleaning step.

In other words, when the chemiluminescence detector detects the sample, before the measuring step, the impurities in the reaction containers 20 may be cleaned once and twice and even for multiple times. In this way, the impurities in the reaction containers 20 are able to be guaranteed to be cleaned, and thus the measurement accuracy of the measuring device 15 is guaranteed. It may be understood that, the above-mentioned cleaning twice refers to continuously clean twice. Before the measuring step, the reaction containers are cleaned twice continuously, and of course, also may be cleaned once.

Each technical characteristic of the above embodiments may be combined freely. To describe concisely, all possible combinations for the each technical characteristic of the above embodiments are not described. However, as long as there is no conflict among the combinations of these technical characteristics, all should be considered as a recording scope of the specification.

The above embodiments are only several embodiments of the present disclosure and are described concretely in detail, and therefore, should not be understood as limits to scope of the present disclosure. It should be noted that, a person of ordinary skill in the part further may make several alternations and improvements without departing from the concept of the present disclosure, and all should be pertain to the scope of protection of the present disclosure. Therefore, the scope of protection of the present disclosure should be subjected to the appended claims.

What is claimed is:

1. A chemiluminescence detector, wherein the chemiluminescence detector comprises:
    a reagent storage device, configured to store a reagent;
    a reaction device, configured to support a plurality of support reaction containers and perform a sample adding operation, a reagent adding operation and an incubating operation, the reaction device comprising a reaction outer disc mechanism configured to support the reaction containers and perform the reagent adding operation and an uniform mixing operation and a reaction inner disc mechanism configured to support the reaction containers and perform the incubating operation, the reaction outer disc mechanism being arranged outside the reaction inner disc mechanism in a sleeving manner, the reaction outer disc mechanism and the reaction inner disc mechanism being respectively and independently operated and the reaction outer disc mechanism and the reaction inner disc mechanism being arranged coaxially, the reaction device further comprises a buffer disc mechanism; and the buffer disc mechanism is provided independent of the reaction outer disc mechanism and is located at the outer periphery side of the reaction outer disc mechanism;

a reaction container automatic transmission device, configured to transmit the reaction containers, the reaction container automatic transmission device is located at the outer periphery side of the buffer disc mechanism, a new cup grabbing mechanism; and the new cup grabbing mechanism is arranged corresponding to the reaction container automatic transmission device and the reaction device, and is configured to transfer each of the reaction containers in the reaction container automatic transmission device to the buffer disc mechanism;

a separate injection device, configured to respectively transfer a sample and the reagent to the reaction containers, the separate injection device comprises a sample adding mechanism and a plurality of liquid transfer mechanisms; the sample adding mechanism is located at an outer periphery side of the buffer disc mechanism and is configured to transfer the sample to empty reaction containers of the buffer disc mechanism; the liquid transfer mechanisms are arranged corresponding to the reaction outer disc mechanism and reagent storage mechanisms of the reagent storage device; and the liquid transfer mechanisms transfer the reagent in the reagent storage mechanisms to the reaction containers of the reaction outer disc mechanism, the buffer disc mechanism comprises a buffer supporting plate for supporting the reaction containers and a buffer driving structure for driving the buffer supporting plate to rotate, the reaction outer disc mechanism comprises a reaction outer disc supporting plate capable of being rotated, a reaction outer disc mounting structure and a reaction outer disc driving structure, the reaction outer disc supporting plate is able to accommodate the reaction containers, the reaction outer disc driving structure is connected with the reaction outer disc supporting plate, and drives the reaction outer disc supporting plate to rotate relative to the reaction outer disc mounting structure;

a cleaning device, configured to remove impurities in the reaction containers, and a measuring device, configured to detect a to-be-tested substance in the reaction containers;

a sample conveying device configured to convey the sample to a sample suction position, wherein the sample suction position is arranged at a periphery side of the buffer disc mechanism and corresponding to the sample adding mechanism; and the sample adding mechanism sucks up the sample at the sample suction position and transfers the sample to the empty reaction containers of the buffer disc mechanism, the sample conveying device comprises a sample storage mechanism and a sample conveying mechanism detachably connected with the sample storage mechanism; multiple sample racks loaded with the sample are stored in the sample storage mechanism; the sample storage mechanism transfers each of the sample racks to the sample conveying mechanism; and the each of the sample racks is conveyed by the sample conveying mechanism to the sample suction position, the sample conveying device further comprises a sample transfer mechanism, through sample transfer mechanism, the sample racks in the sample storage mechanism is transferred to the sample conveying mechanism;

a cleaning cup grabbing mechanism, the cleaning cup grabbing mechanism is arranged corresponding to the cleaning device and the reaction outer disc mechanism, and is configured to transfer each of the reaction containers among the reaction outer disc mechanism, the reaction inner disc mechanism and the cleaning device, wherein the cleaning cup grabbing mechanism is able to transfer incubated reaction containers in the reaction inner disc mechanism to the cleaning device, the cleaning cup grabbing mechanism further is able to transfer the reaction containers that are cleaned and need to be added with the reagent again to the reaction outer disc mechanism;

wherein the reagent storage device, the separate injection device, the cleaning device and the measuring device are arranged around an outer periphery side of the reaction outer disc mechanism.

2. The chemiluminescence detector as claimed in claim 1, wherein the reaction outer disc mechanism is provided with multiple reaction stations, comprising a cup adding station, a reagent adding station and an incubation cup taking station; the reaction inner disc mechanism is provided with an incubation cup placing station;

the buffer disc mechanism is arranged corresponding to the cup adding station; the reaction containers in the buffer disc mechanism are respectively transferred to the cup adding station of the reaction outer disc mechanism;

the liquid transfer mechanisms and the reagent storage device are arranged corresponding to the reagent adding station; the liquid transfer mechanisms transfer the reagent in the reagent storage device to each of the reaction containers corresponding to the reagent adding station of the reaction outer disc mechanism;

the incubation cup taking station is arranged corresponding to the incubation cup placing station; and each of the reaction containers in the reaction outer disc mechanism is taken out at the incubation cup taking station and is transferred to the incubation cup placing station of the reaction inner disc mechanism.

3. The chemiluminescence detector as claimed in claim 2, wherein the reaction inner disc mechanism is provided with a cleaning cup taking station; the multiple reaction stations further comprise a cleaning cup placing station;

the cleaning device is arranged respectively corresponding to the cleaning cup taking station and the cleaning cup placing station; each of the reaction containers in the reaction inner disc mechanism is taken out at the cleaning cup taking station and is transferred to the cleaning device; and each of the reaction containers in the cleaning device is transferred to the cleaning cup placing station of the reaction outer disc mechanism.

4. The chemiluminescence detector as claimed in claim 3, wherein the multiple reaction stations further comprise a uniform mixing station; the chemiluminescence detector further comprises an uniform mixing device; the uniform mixing device is provided on the reaction outer disc mechanism, is arranged corresponding to the uniform mixing station and is configured to perform the uniform mixing operation on a mixture in each of the reaction containers in the reaction outer disc mechanism.

5. The chemiluminescence detector as claimed in claim 4, wherein the cup adding station, the cleaning cup placing station, the reagent adding station, the uniform mixing station and the incubation cup taking station are arranged sequentially on the reaction outer disc mechanism.

6. The chemiluminescence detector as claimed in claim 2, wherein the chemiluminescence detector further comprises a sample cup grabbing mechanism, an incubation cup grabbing mechanism, and a measurement cup grabbing mechanism, wherein the sample cup grabbing mechanism is arranged corresponding to the buffer disc mechanism and the cup adding station of the reaction outer disc mechanism, and is configured to transfer a reaction container in which the sample is added completely in the buffer disc mechanism to the reaction outer disc mechanism;

the incubation cup grabbing mechanism is arranged corresponding to the incubation cup taking station of the reaction outer disc mechanism and the incubation cup placing station of the reaction inner disc mechanism, and is configured to transfer each of the reaction containers between the reaction outer disc mechanism and the reaction inner disc mechanism; and the measurement cup grabbing mechanism is arranged corresponding to the cleaning device and the measuring device, and is configured to transfer each of the reaction containers after being cleaned in the cleaning device to the measuring device.

7. The chemiluminescence detector as claimed in claim 6, wherein the measuring device is arranged adjacent to the cleaning device.

8. The chemiluminescence detector as claimed in claim 1, wherein an input end of the sample conveying mechanism is able to be in abutment joint with the sample storage mechanism, or is able to be in abutment joint with an output end of a sample conveying mechanism of another chemiluminescence detector; and an output end of the sample conveying mechanism is able to be in abutment joint with an input end of a sample conveying mechanism of a still another chemiluminescence detector.

9. The chemiluminescence detector as claimed in claim 1, wherein the chemiluminescence detector further comprises a consumable box loading device configured to automatically transmit consumable storage boxes loaded with liquid suction heads; the consumable box loading device further is able to transmit the consumable storage boxes to a loading position; and the sample adding mechanism loads the liquid suction heads at the loading position and transfers the sample via the liquid suction heads.

10. The chemiluminescence detector as claimed in claim 9, wherein the consumable box loading device is located at the outer periphery side of the buffer disc mechanism far away from the reaction container automatic transmission device, and is arranged corresponding to the sample loading mechanism.

11. The chemiluminescence detector as claimed in claim 1, wherein the chemiluminescence detector further comprises a pedestal, the pedestal is provided with a supporting platform; and the reaction device, the measuring device, the cleaning device, the separate injection device and the reagent storage device all are arranged on the supporting platform, and the chemiluminescence detector further comprises a control device and a liquid path device, the control device is electrically connected with the reaction device, the measuring device, the cleaning device, the separate injection device and the reagent storage device; the liquid path device is connected with the separate injection device; the pedestal is further provided with a holding space; the holding space is located below the supporting platform; and the control device and the liquid path device are provided in the holding space.

12. The chemiluminescence detector as claimed in claim 1, wherein the reaction outer disc supporting plate is of a circular shape, and multiple placement holes are formed on the reaction outer disc supporting plate, the reaction outer disc mechanism further comprises:

a tension structure, which is provided on a reaction outer disc mounting bottom plate of the reaction outer disc mounting structure, and is abutted against a reaction outer disc synchronous belt.

13. The chemiluminescence detector as claimed in claim 12, wherein the tension structure comprises:

a tension wheel;

a tension wheel shaft, wherein the tension wheel is rotationally arranged on the tension wheel shaft and the tension wheel is located outside the reaction outer disc synchronous belt;

a tension guiding rod, which is fixed on the reaction outer disc mounting structure;

a tension elastic piece, wherein one end of the tension elastic piece is fixed on the tension guiding rod, and the other end of the tension elastic piece is connected with the tension wheel shaft, the tension elastic piece is able to be moved along the tension guiding rod, so that the tension wheel is abutted against the reaction outer disc synchronous belt.

14. The chemiluminescence detector as claimed in claim 1, wherein the reaction inner disc mechanism comprises:

a reaction inner disc supporting plate;

a reaction temperature control structure, which is arranged below the reaction inner disc supporting plate, and is capable of heating the reaction containers in the reaction inner disc supporting plate.

15. The chemiluminescence detector as claimed in claim 14, wherein the reaction inner disc mechanism further comprises a heat preservation cover structure, wherein the heat preservation cover structure is covered on the reaction inner disc supporting plate, an incubation cup placing groove and a cleaning cup taking groove are formed on the heat preservation cover structure, the incubation cup placing groove and the cleaning cup taking groove are formed along a radial direction of the reaction inner disc supporting plate, the incubation cup placing groove is corresponding to an incubation cup placing station area, the cleaning cup taking groove is corresponding to an cleaning cup taking station area, the incubation cup placing groove is arranged corresponding to an incubation cup taking station on the reaction outer disc supporting plate, and the cleaning cup taking groove is arranged corresponding to the cleaning device.

* * * * *